US011575152B2

(12) United States Patent
Kim et al.

(10) Patent No.: US 11,575,152 B2
(45) Date of Patent: Feb. 7, 2023

(54) OXIDE, PREPARATION METHOD THEREOF, SOLID ELECTROLYTE INCLUDING THE OXIDE, AND ELECTROCHEMICAL DEVICE INCLUDING THE OXIDE

(71) Applicant: Samsung Electronics Co., Ltd., Suwon-si (KR)

(72) Inventors: Ryounghee Kim, Uiwang-si (KR); Yan Wang, Burlington, MA (US); Lincoln Miara, Burlington, MA (US); Hyeokjo Gwon, Hwaseong-si (KR); Sewon Kim, Suwon-si (KR); Jusik Kim, Hwaseong-si (KR); Victor Roev, Hwaseong-si (KR); Myungjin Lee, Seoul (KR); Sungkyun Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 128 days.

(21) Appl. No.: 16/914,859

(22) Filed: Jun. 29, 2020

(65) Prior Publication Data
US 2021/0408576 A1 Dec. 30, 2021

(51) Int. Cl.
*H01M 10/0562* (2010.01)
*C01B 25/45* (2006.01)
(Continued)

(52) U.S. Cl.
CPC ........ *H01M 10/0562* (2013.01); *C01B 25/45* (2013.01); *C01B 25/455* (2013.01);
(Continued)

(58) Field of Classification Search
None
See application file for complete search history.

(56) References Cited

U.S. PATENT DOCUMENTS

| 4,009,092 A | 2/1977 | Taylor |
| 6,402,795 B1 | 6/2002 | Chu et al. |

(Continued)

FOREIGN PATENT DOCUMENTS

| CN | 103474656 A | 12/2013 |
| CN | 109888374 A | 6/2019 |

(Continued)

OTHER PUBLICATIONS

Kim et al., LiTa2PO8: a fast lithium-ion conductor with new framework structure, Oct. 2018, J. Mater. Chem. A, 6, 22478-22482 (Year : 2018).*

(Continued)

*Primary Examiner* — Daniel S Gatewood
(74) *Attorney, Agent, or Firm* — Cantor Colburn LLP

(57) ABSTRACT

An oxide includes a compound represented by Formula 1, a compound represented by Formula 2, or a combination thereof:

$$Li_{1-x+y-z}Ta_{2-x}M_xP_{1-y}Q_yO_{8-z}X_z \quad \text{Formula 1}$$

wherein, in Formula 1,
M is an element having an oxidation number of 5+ or 6+,
Q is an element having an oxidation number of 4+,
X is a halogen atom, a pseudohalogen, or a combination thereof,
0≤x<0.6, 0≤y<1, and 0≤z<1, wherein x and y are not 0 at the same time, $$Li_{1-x+y}Ta_{2-x}M_xP_{1-y}Q_yO_8 \cdot zLiX \quad \text{Formula 2}$$

wherein, in Formula 2,
M is an element having an oxidation number of 5+ or 6+,
Q is an element having an oxidation number of 4+,
X is a halogen atom, a pseudohalogen or a combination thereof, (Continued)

$0 \leq x < 0.6$, $0 \leq y < 1$, and $0 \leq z < 1$, wherein x and y are not 0 at the same time, and wherein in Formulas 1 and 2, M, Q, x, y, and z are independently selected.

20 Claims, 21 Drawing Sheets

(51) Int. Cl.

| | | |
|---|---|---|
| *C01B 25/455* | (2006.01) | |
| *C01B 33/32* | (2006.01) | |
| *H01M 4/36* | (2006.01) | |
| *H01M 4/62* | (2006.01) | |
| *H01M 10/0525* | (2010.01) | |

(52) U.S. Cl.
CPC ............ *C01B 33/32* (2013.01); *H01M 4/366* (2013.01); *H01M 4/62* (2013.01); *H01M 10/0525* (2013.01); *C01P 2002/50* (2013.01); *C01P 2002/72* (2013.01); *C01P 2002/88* (2013.01); *C01P 2004/03* (2013.01); *C01P 2006/40* (2013.01); *H01M 2300/0071* (2013.01)

(56) References Cited

U.S. PATENT DOCUMENTS

| | | | |
|---|---|---|---|
| 6,485,622 | B1 | 11/2002 | Fu |
| 7,514,181 | B2 | 4/2009 | Ugaji et al. |
| 7,901,658 | B2 | 3/2011 | Weppner |
| 8,828,580 | B2 | 9/2014 | Visco et al. |
| 9,490,500 | B2 | 11/2016 | Shin et al. |
| 10,128,533 | B2 | 11/2018 | Yamamoto et al. |
| 2016/0181657 | A1 | 6/2016 | Kawaji et al. |
| 2018/0006326 | A1 | 1/2018 | O'Neill et al. |
| 2018/0006328 | A1 | 1/2018 | O'Neill et al. |
| 2018/0159172 | A1 | 6/2018 | O'Neill et al. |
| 2019/0207252 | A1 | 7/2019 | Badding |
| 2020/0373613 | A1 | 11/2020 | Kim et al. |
| 2021/0202988 | A1 | 7/2021 | Kim et al. |
| 2021/0408576 | A1 | 12/2021 | Kim et al. |

FOREIGN PATENT DOCUMENTS

| | | |
|---|---|---|
| EP | 3621130 A | 3/2020 |
| EP | 3932860 A1 | 1/2022 |
| JP | 6321443 B2 | 5/2018 |
| KR | 1020160113842 A | 10/2016 |
| KR | 10-1909727 B1 | 10/2018 |
| KR | 101940240 B1 | 1/2019 |
| KR | 102101271 B1 | 4/2020 |
| WO | 2012147837 A1 | 11/2012 |
| WO | 2020036290 A1 | 2/2020 |

OTHER PUBLICATIONS

Jaegyeom Kim et al., "LiTa2PO8: A Fast Lithium-ion Conductor with New Framework Structure," Electronic Supplementary Material (ESI) for Journal of Materials Chemistry A, 2018, pp. S1-S11.

Mohammed Isah Kimpa et al., "Physical Characterization and Electrical Conductivity of Li1.2Ti1.8Al0.2(PO4)3 and Li1.2Ta0.9Al1.1(PO4)3 Nasicon Material," International Journal of Integrated Engineering: Special Issue 2018, Dec. 31, 2018, pp. 108-112, vol. 10, No. 9.

Zhizhen Zhang et al., "New Horizons for Inorganic Solid State Ion Conductors," Energy & Environmental Science, Jun. 11, 2018, pp. 1945-1976, vol. 11.

Extended European Search Report dated Jan. 11, 2021 of EP Patent Application No. 20187112.6.

Fiaz Hussain et al., "Theoretical Insights into Li-Ion Transport in LiTa2PO8," The Journal of Physical Chemistry C, Jul. 23, 2019, pp. 19282-19287, vol. 123.

Jaegyeom Kim et al., "LiTa2PO8: a fast lithium-ion conductor with new framework structure," Journal of Materials Chemistry A, Oct. 29, 2018, pp. 22478-22482, vol. 6.

Jaegyeom Kim, "Synthesis, crystal structures, and ionic transport properties of three-dimensional framework oxides, Ma2PO8 (A = H, Li, and Na)," Graduate School of Ajou University, Department of Energy Systems Research Applied Chemistry, Feb. 2019, pp. 1-127.

Jürgen Janek et al., "A solid future for battery development," Nature Energy, Sep. 2016, pp. 1-4, vol. 1, DOI: 10.1038/NENERGY.2016 141.

Zhongliang Xiao et al., "LiTa2PO8 coated nickel-rich cathode material for improved electrochemical performance at nigh voltage," Ceramics International, 2020, pp. 8328-8333, vol. 46.

Lincoln J. Miara et al., "First-Principles Studies on Cation Dopants and Electrolyte|Cathode Interphases for Lithium Garnets," Chemistry of Materials, Apr. 30, 2015, vol. 27, pp. 4040-4047.

M. V. Sukhanov et al., "Synthesis and Structure of New Framework Phosphates Li 1/4 M 7/4 (PO4)3(M= Nb, Ta)," Crystallography Reports, 2008, pp. 974-980, vol. 53, No. 6, DOI: 10.1134/S1063774508060102.

Norikazu Ishigaki et al. "Structural and Li-ion diffusion properties of lithium tantalum phosphate LiTa2PO8," Solid State Ionics, 2020, pp. 1-6, vol. 351, No. 115314.

Zhizhen Zhang et al., "New Horizons for Inorganic Solid State Ion Conductors," Energy & Environmental Science, Jun. 11, 2018, pp. 1-69, DOI: 10.1039/C8EE01053F.

Jaegyeom Kim et al.,Supporting Information—Electronic Supplementary Material for "LiTa2PO8: a fast lithium-ion conductor with new framework structure," Journal of Materials Chemistry A, Oct. 29, 2018, pp. 22478-22482, vol. 6.

\* cited by examiner

OXIDE, PREPARATION METHOD THEREOF, SOLID ELECTROLYTE INCLUDING THE OXIDE, AND ELECTROCHEMICAL DEVICE INCLUDING THE OXIDE

BACKGROUND

1. Field

The present disclosure relates to an oxide, a method of preparing the oxide, and a solid electrolyte and an electrochemical device, each including the oxide.

2. Description of Related Art

Lithium secondary batteries have high electrochemical capacity, high operating potential, and excellent charge and discharge cycle characteristics, and thus there is an increased use of such batteries in portable information terminals, portable electronic devices, small home electric power storage devices, motorcycles, electric vehicles, and hybrid electric vehicles. With the spread of the use of lithium secondary batteries, improved safety and high performance are desired.

Because lithium secondary batteries of the prior art use a liquid electrolyte, ignition is likely to occur on exposure to moisture in the air, which raises safety concerns. Such safety concerns are becoming more prominent because of the use of lithium secondary batteries in electric vehicles. Accordingly, in recent years, there has been active research into all-solid-state secondary batteries using a solid electrolyte including inorganic materials in order to improve safety. All-solid-state secondary batteries attract attention as next-generation secondary batteries in terms of safety, high energy density, high power output, long lifespan, simplification of manufacturing process, larger battery size, compact size, and lower cost.

Nonetheless, there remains a need for an improved solid electrolytes exhibiting high-ionic conductivity at room temperature.

SUMMARY

Provided is an oxide having high ionic conductivity at room temperature and improved lithium stability.

Provided is a method of preparing the oxide.

Provided is a solid electrolyte including the oxide.

Provided is an electrochemical device including the oxide.

Additional aspects will be set forth in part in the description which follows and, in part, will be apparent from the description.

According to an aspect, provided is an oxide including a compound represented by Formula 1, a compound represented by Formula 2, or a combination thereof:

$$Li_{1-x+y-z}Ta_{2-x}M_xP_{1-y}Q_yO_{8-z}X_z \quad \text{Formula 1}$$

wherein, in Formula 1,

M is an element having an oxidation number of 5+ or 6+,
Q is an element having an oxidation number of 4+,
X is a halogen atom, a pseudohalogen or a combination thereof,
0≤x<0.6, 0≤y<1, and 0≤z<1, wherein x and y are not 0 at the same time, $$Li_{1-x+y}Ta_{2-x}M_xP_{1-y}Q_yO_8 \cdot zLiX \quad \text{Formula 2}$$

wherein, in Formula 2,

M is an element having an oxidation number of 5+ or 6+,
Q is an element having an oxidation number of 4+,
X is a halogen atom, a pseudohalogen or a combination thereof,
0≤x<0.6, 0≤y<1, and 0≤z<1, wherein x and y are not 0 at the same time, and wherein in Formulas 1 and 2, M, Q, x, y, and z are independently selected.

According to an aspect, a method of preparing the oxide includes:

contacting a lithium precursor, a tantalum precursor, an M precursor, a Q precursor, and a phosphorous precursor to obtain a precursor mixture; and heat-treating the precursor mixture in an oxidizing gas atmosphere to prepare the oxide, wherein the oxide is a compound represented by Formula 1, a compound represented by Formula 2, or a combination thereof $$Li_{1-x+y-z}Ta_{2-x}M_xP_{1-y}Q_yO_{8-z}X_z \quad \text{Formula 1}$$

wherein, in Formula 1,

M is an element having an oxidation number of 5+ or 6+,
Q is an element having an oxidation number of 4+,
X is a halogen atom, a pseudohalogen or a combination thereof,
0≤x<0.6, 0≤y<1, and 0≤z<1, wherein x and y are not 0 at the same time, $$Li_{1-x+y}Ta_{2-x}M_xP_{1-y}Q_yO_8 \cdot zLiX \quad \text{Formula 2}$$

wherein, in Formula 2,

M is an element having an oxidation number of 5+ or 6+,
Q is an element having an oxidation number of 4+,
X is a halogen atom, a pseudohalogen or a combination thereof,
0≤x<0.6, 0≤y<1, and 0≤z<1, wherein x and y are not 0 at the same time.

According to an aspect, there is provided a solid electrolyte including the oxide and a binder.

According to an aspect, there is provided an electrochemical device including a cathode, an anode, and a solid electrolyte disposed between the cathode and the anode, wherein at least one of the cathode, the anode or the solid electrolyte includes the oxide.

In an embodiment, the electrochemical device may be an electrochemical battery.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
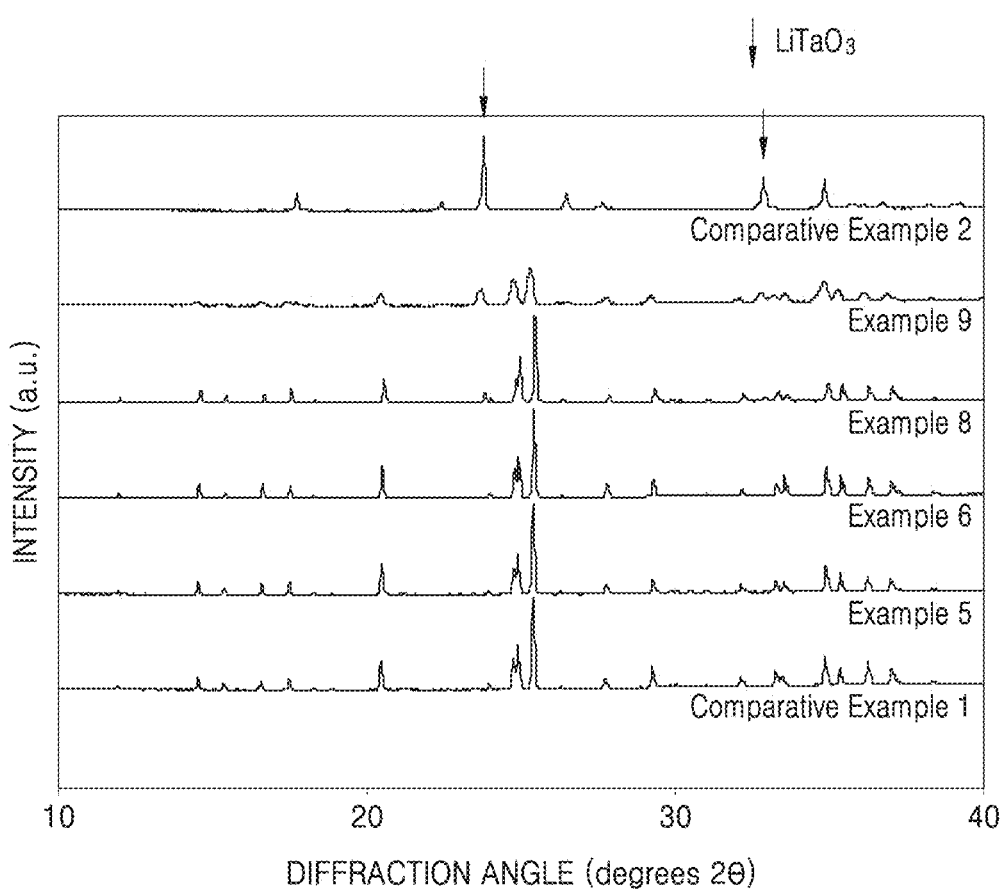
FIG. 1 is a graph of intensity in arbitrary units (a.u.) versus diffraction angle (° 2θ) of oxides prepared in Example 5, Example 6, Example 8, Example 9, Comparative Example 1, and Comparative Example 2, when analyzed by X-ray diffraction using Cu Kα radiation.

The invention will now be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As used herein, a "pseudohalogen" includes two or more electronegative atoms, which like halogens in the free state, can provide an anions similar to a halide ion. Examples of pseudohalogens are a cyanide (CN), a cyanate (OCN), a thiocyanate (SCN), an azide ($N_3$), or a combination thereof.

As used herein, the term "particle size" may refer to the particle diameter if particles are spherical, or the length of the major axis if particles are non-spherical.

Particle size can be determined by light scattering or by scanning electron microscopy (SEM).

An all-solid-state secondary battery includes a cathode, a solid electrolyte, and an anode, wherein the solid electrolyte has high ionic conductivity and low electronic conductivity. Solid electrolytes for all-solid-state secondary batteries include a sulfide-based solid electrolyte and an oxide-based solid electrolyte. Among these solid electrolytes, oxide-based solid electrolytes do not generate toxic substance in a preparation process, and have excellent stability, but are limited because they have lower room temperature ionic conductivity compared to a sulfide-based solid electrolyte.

Hereinafter, embodiments of an oxide, a preparation method thereof, and a solid electrolyte and an electrochemical device, each including the oxide, will be described in greater detail.

An oxide includes a compound represented by Formula 1, a compound represented by Formula 2, or a combination thereof.

$$Li_{1-x+y-z}Ta_{2-x}M_xP_{1-y}Q_yO_{8-z}X_z \quad \text{Formula 1}$$

In Formula 1, M is an element having an oxidation number of 5+ or 6+, Q is an element having an oxidation number of 4+, X is a halogen atom, a pseudohalogen, or a combination thereof, and 0≤x<0.6, 0≤y<1, and 0≤z<1, wherein x and y are not 0 at the same time.

$$Li_{1-x+y}Ta_{2-x}M_xP_{1-y}Q_yO_8 \cdot zLiX \quad \text{Formula 2}$$

In Formula 2, M is an element having an oxidation number of 5+ or 6+, Q is an element having an oxidation number of 4+, X is a halogen atom, a pseudohalogen, or a combination thereof, and 0≤x<0.6, 0≤y<1, and 0≤z<1, wherein x and y are not 0 at the same time.

In Formulas 1 and 2, M, Q, x, y, and z are independently selected. In Formulas 1 and 2, each M is independently an element for substituting tantalum having an oxidation number of 5+ and may have, for example, an oxidation number of 5+, or an oxidation number of 6+, and a coordination number of 6.

In Formulae 1 and 2, each Q independently may have a coordination number of, for example, 4.

The compound of Formula 1 may have a form in which X in Formula 1 substitutes for oxygen and resides on an oxygen site in a crystal structure of the compound. The compound of Formula 2 may have a composite form in which LiX, for example, LiCl, is added as an additive to $Li_{1-x+y}Ta_{2-x}M_xP_{1-y}Q_yO_8$.

As used herein, in regard to the expression "compound represented by Formula 1, compound represented by Formula 2, or a combination thereof," the expression "a combination thereof" may refer to, for example, a mixture of a compound represented by Formula 1 and a compound represented by Formula 2, or a composite of a compound represented by Formula 1 and a compound represented by Formula 2.

In Formulae 1 and 2, each M independently may be, for example, tungsten (W), tellurium (Te), selenium (Se), niobium (Nb), vanadium (V), antimony (Sb), chromium (Cr), molybdenum (Mo), neodymium (Nd), technetium (Tc), bismuth (Bi), or a combination thereof.

In Formulae 1 and 2, x may be, for example, greater than 0 and about 0.5 or less, for example, greater than 0 and less than about 0.5, for example, about 0.1 or more and less than 0.5, or for example, about 0.1 to about 0.2.

In Formula 1, Q may be an element having an oxidation number of 4+. In an aspect, Q may substitute for phosphorous (P), and may reside on a P site in a crystal structure of the compound. In an aspect, Q may be, for example, silicon (Si), tin (Sn), titanium (Ti), germanium (Ge), niobium (Nb), selenium (Se), palladium (Pd), rhodium (Rh), cobalt (Co), molybdenum (Mo), chromium (Cr), ruthenium (Ru), nickel (Ni), manganese (Mn), vanadium (V), molybdenum (Mo), or a combination thereof.

Silicon (Si), tin (Sn), titanium (Ti), germanium (Ge), and niobium (Nb) may have an oxidation number of 4+, and selenium (Se) may have an oxidation number of 4+ or 6+. In Formula 1, y may be more than 0 and about 0.5 or less, for example, about 0.1 to about 0.5, or for example, about 0.1 to about 0.2. Q in Formulas 1 and 2 may be independently selected.

In Formulae 1 and 2, X may substitute for oxygen, and in a crystal structure of the compound of Formula 1 or 2, X may reside on an oxygen site. In an aspect, X may be, for example, chlorine (Cl), bromine (Br), fluorine (F), a cyanide (CN), a cyanate (OCN), a thiocyanate (SCN), an azide ($N_3$), or a combination thereof. In Formulae 1 and 2, z may be more than 0 and about 0.9 or less, for example, about 0.01 to about 0.8, for example, about 0.01 to about 0.7, for example, about 0.01 to about 0.6, for example, about 0.01 to about 0.5, for example, about 0.01 to about 0.2, or for example, about 0.05 to about 0.15. X in Formulas 1 and 2 may be independently selected.

As a lithium phosphate-based lithium ion conductor, $LiTa_2PO_8$ has been considered.

However, $LiTa_2PO_8$ is not satisfactory in terms of room temperature ionic conductivity or lithium stability. Accordingly, a compound with improved ionic conductivity and lithium stability are desired.

In this regard, the present inventors have surprisingly discovered an oxide having improved ionic conductivity at room temperature and improved lithium stability.

The oxide can be provided by introducing an M element having an oxidation number of 5+ or 6+ at a tantalum (Ta) octahedral sites of $LiTa_2PO_8$, by introducing an element having an oxidation number of 4+ and a coordination number of 4 at a phosphorous (P) tetrahedral sites, or by introducing, at the same time, an M element having an oxidation number of 5+ or 6+ and an element having an oxidation number of 4+ and a coordination number of 4 at a phosphorous (P) tetrahedral site. The oxide may be a lithium ion conductor.

In addition, a halogen such as chlorine (Cl) or fluorine (F), and/or a pseudohalogen may be introduced into the oxygen (O) site of the oxide. While not wanting to be bound by theory, it is understood that when the oxide into which a halogen and/or a pseudohalogen is introduced is used in preparing a solid electrolyte, a passivation layer including fluorine (F) may be formed between a lithium metal electrode and the solid electrolyte containing the oxide. When the passivation layer is provided, the solid electrolyte may have improved lithium stability, and may have improved Li-ion conductivity at grain boundaries of the solid electrolyte due to the presence of LiF or LiCl at the grain boundary region.

The oxide according to an embodiment may be a lithium ion conductor, and may have, as a $LiTa_2PO_8$, a monoclinic structure, e.g., having a space group of C2/c, or a monoclinic-like structure, or a corner-sharing structure of two $[MO_6]$ octahedrons and one $[PO_4]$ tetrahedron.

The oxide may be electrically neutral. To meet the electrical neutrality of the oxide, $Li^+$ vacancies may be introduced. Here, the introduced vacancies may serve as $Li^+$-hopping sites to reduce the activation energy required for Li migration.

In an aspect Q is Si in the compound represented by Formula 1 and may be a compound represented by Formula 3.

$$Li_{1-x+y-z}Ta_{2-x}W_xP_{1-y}Si_yO_{8-z}X_z \qquad \text{Formula 3}$$

In Formula 3, X is a halogen, a pseudohalogen, or a combination thereof, and $0 \leq x < 0.6$, $0 \leq y < 1$, and $0 \leq z < 1$, wherein x and y are not 0 at the same time.

In Formula 3, x may be, for example, greater than 0 and about 0.5 or less, for example, greater than 0 and less than about 0.5, for example, about 0.1 or more and less than about 0.5, or for example, about 0.1 to about 0.2; y may be greater than 0 and about 0.5 or less, for example, about 0.1 to about 0.5, or for example, about 0.1 to about 0.2; and z may be greater than 0 and about 0.9 or less, for example, about 0.01 to about 0.8, for example, about 0.01 to about 0.7, for example, about 0.01 to about 0.6, for example, about 0.01 to about 0.5, for example, about 0.01 to about 0.2, or for example, about 0.05 to about 0.15.

In Formula 3, tungsten ($W^{6+}$) may substitute for tantalum and reside on a tantalum site in a crystal structure of the compound. In this regard, because the radius of tungsten ($W^{6+}$) is 0.06 Å, and the radius of $Ta^{5+}$ is 0.064 Å, this substitution may be easy.

In addition, when Si having an oxidation number of 4+, instead of P having an oxidation number of 5+, is introduced into $[PO_4]$ tetrahedrons, excess $Li^+$ ions may be introduced to provide the electric neutrality of the compound, so that the amount of movable $Li^+$ ions may be increased, leading to increased lithium ion conductivity.

When some oxygen sites are substituted with X anions, a passivation layer including an element such as F or Cl may be formed, thus improved lithium stability and increased Li ion conductivity at grain boundaries due to the presence of LiF or LiCl at the grain boundaries may occur.

In the compound of Formula 2, M may be W and Q may be Si, and the compound represented by Formula 2 may be, for example, a compound represented by Formula 4.

$$Li_{1-x+y}Ta_{2-x}W_xP_{1-y}Si_yO_8 \cdot zLiX \qquad \text{Formula 4}$$

In Formula 4, X may be a halogen atom, a pseudohalogen, or a combination thereof, and $0 \leq x < 0.6$, $0 \leq y < 1$, and $0 \leq z < 1$, wherein x and y are not 0 at the same time.

In Formula 4, x may be, for example, greater than 0 and about 0.5 or less, for example, greater than 0 and about 0.5 or less, for example, about 0.1 or more and less than about 0.5, or for example, about 0.1 to about 0.2;

In Formula 4, y may be greater than 0 and about 0.5 or less, for example, about 0.1 to about 0.5, or for example, about 0.1 to about 0.2; and z may be greater than 0 and about 0.9 or less, for example, about 0.01 to about 0.8, for example, about 0.01 to about 0.7, for example, about 0.01 to about 0.6, for example, about 0.01 to about 0.5, for example, about 0.01 to about 0.2, or for example, about 0.05 to about 0.15.

The compound represented by Formula 1, the compound represented by Formula 2, or a combination thereof may be, for example, the compound represented by Formula 3, the compound represented by Formula 4, or a combination thereof.

In an embodiment, the oxide may be, for example, $Li_{0.9}Ta_{1.9}W_{0.1}PO_8$, $Li_{0.8}Ta_{1.8}W_{0.2}PO_8$, $Li_{0.7}Ta_{1.7}W_{0.3}PO_8$, $Li_{0.75}Ta_{1.75}W_{0.25}PO_8$, $Li_{0.6}Ta_{1.6}W_{0.4}PO_8$, $Li_{0.5}Ta_{1.5}W_{0.5}PO_8$; $Li_{0.9}Ta_{1.9}Te_{0.1}PO_8$, $Li_{0.8}Ta_{1.8}Te_{0.2}PO_8$, $Li_{0.75}Ta_{1.75}Te_{0.25}PO_8$, $Li_{0.7}Ta_{1.7}Te_{0.3}PO_8$, $Li_{0.6}Ta_{1.6}Te_{0.4}PO_8$, $Li_{0.6}Ta_{1.5}Te_{0.5}PO_8$; $Li_{0.9}Ta_{1.9}Se_{0.1}PO_8$, $Li_{0.8}Ta_{1.8}Se_{0.2}PO_8$, $Li_{0.75}Ta_{1.75}Se_{0.25}PO_8$, $Li_{0.7}Ta_{1.7}Se_{0.3}PO_8$, $Li_{0.6}Ta_{1.6}Se_{0.4}PO_8$, $Li_{0.5}Ta_{1.5}Se_{0.5}PO_8$; $Li_{0.8}Ta_{1.9}W_{0.1}PO_{7.9}Cl_{0.1}(Li_{0.9}Ta_{1.9}W_{0.1}PO_8 \cdot 0.1LiCl)$, $Li_{0.7}Ta_{1.8}W_{0.2}PO_{7.9}Cl_{0.1}$ $(Li_{0.8}Ta_{1.8}W_{0.2}PO_8 \cdot 0.1LiCl)$, $Li_{0.65}Ta_{1.75}W_{0.25}PO_{7.9}Cl_{0.1}$, $Li_{0.6}Ta_{1.7}W_{0.3}PO_{7.9}Cl_{0.1}$, $Li_{0.5}Ta_{1.6}W_{0.4}PO_{7.9}Cl_{0.1}$, $Li_{0.4}Ta_{1.5}W_{0.5}P_{7.9}O_{7.9}Cl_{0.1}$; $Li_{0.85}Ta_{1.9}W_{0.1}PO_{7.95}Cl_{0.05}$, $Li_{0.75}Ta_{1.8}W_{0.2}PO_{7.95}Cl_{0.05}$, $Li_{0.7}Ta_{1.75}W_{0.25}PO_{7.95}Cl_{0.05}$, $Li_{0.65}Ta_{1.7}W_{0.3}PO_{7.95}Cl_{0.05}$, $Li_{0.55}Ta_{1.6}W_{0.4}PO_{7.95}Cl_{0.05}$, $Li_{0.45}Ta_{1.5}W_{0.5}PO_{7.95}Cl_{0.05}$; $Li_{0.8}Ta_{1.9}Nb_{0.1}PO_{7.9}Cl_{0.1}$, $Li_{0.7}Ta_{1.8}Nb_{0.2}PO_{7.9}Cl_{0.1}$, $Li_{0.65}Ta_{1.75}Nb_{0.25}PO_{7.9}Cl_{0.1}$, $Li_{0.6}Ta_{1.7}Nb_{0.3}PO_{7.9}Cl_{0.1}$, $Li_{0.5}Ta_{1.6}Nb_{0.4}PO_{7.9}Cl_{0.1}$, $Li_{0.4}Ta_{1.5}Nb_{0.5}P_{7.9}Cl_{0.1}$; $Li_{0.85}Ta_{1.9}Nb_{0.1}PO_{7.95}Cl_{0.05}$, $Li_{0.75}Ta_{1.8}Nb_{0.2}PO_{7.95}Cl_{0.05}$, $Li_{0.7}Ta_{1.75}Nb_{0.25}PO_{7.95}Cl_{0.05}$, $Li_{0.65}Ta_{1.7}Nb_{0.3}PO_{7.95}Cl_{0.05}$, $Li_{0.55}Ta_{1.6}Nb_{0.4}PO_{7.95}Cl_{0.05}$, $Li_{0.45}Ta_{1.5}Nb_{0.5}PO_{7.95}Cl_{0.05}$; $Li_{1.1}Ta_2P_{0.9}Si_{0.1}O_8$, $Li_{1.2}Ta_2P_{0.8}Si_{0.2}O_8$, $Li_{1.3}Ta_2P_{0.7}Si_{0.3}O_8$, $Li_{1.4}Ta_2P_{0.6}Si_{0.4}O_8$, $Li_{1.5}Ta_2P_{0.5}Si_{0.5}O_8$; $Li_1Ta_2P_{0.9}Si_{0.1}PO_{7.9}Cl_{0.1}$, $Li_{1.1}Ta_2P_{0.8}Si_{0.2}PO_{7.9}Cl_{0.1}$, $Li_{1.2}Ta_2P_{0.7}Si_{0.3}PO_{7.9}Cl_{0.1}$, $Li_{1.3}Ta_2P_{0.6}Si_{0.4}PO_{7.9}Cl_{0.1}$, $Li_{1.4}Ta_2P_{0.8}Si_{0.5}PO_{7.9}C_{0.1}$; $Li_{1.05}Ta_2P_{0.9}Si_{0.1}PO_{7.95}Cl_{0.05}$, $Li_{1.15}Ta_2P_{0.8}Si_{0.2}PO_{7.95}Cl_{0.05}$, $Li_{1.25}Ta_2P_{0.7}Si_{0.3}P_{0.95}Cl_{0.05}$, $Li_{1.35}Ta_2P_{0.6}Si_{0.4}PO_{7.95}Cl_{0.05}$, $Li_{1.45}Ta_2P_{0.5}Si_{0.5}PO_{7.95}Cl_{0.05}$; $Li_{1.1}Ta_2P_{0.9}Sn_{0.1}O_8$, $Li_{1.2}Ta_2P_{0.8}Sn_{0.2}O_8$, $Li_{1.3}Ta_2P_{0.7}Sn_{0.3}O_8$, $Li_{1.4}Ta_2P_{0.6}Sn_{0.4}O_8$, $Li_{1.5}Ta_2P_{0.5}Sn_{0.5}O_8$; $Li_{1.0}Ta_2P_{0.9}Sn_{0.1}O_{7.9}Cl_{0.1}$, $Li_{1.1}Ta_2P_{0.8}Sn_{0.2}O_{7.9}Cl_{0.1}$, $Li_{1.2}Ta_2P_{0.7}Sn_{0.3}O_{7.9}Cl_{0.1}$, $Li_{1.3}Ta_2P_{0.6}Sn_{0.4}O_{7.9}Cl_{0.1}$, $Li_{1.4}Ta_2P_{0.8}Sn_{0.5}O_{7.9}Cl_{0.1}$; $Li_{1.05}Ta_2P_{0.9}Sn_{0.1}O_{7.95}Cl_{0.05}$, $Li_{1.15}Ta_2P_{0.8}Sn_{0.2}O_{7.95}Cl_{0.05}$, $Li_{1.25}Ta_2P_{0.7}Sn_{0.3}O_{7.95}Cl_{0.05}$, $Li_{1.35}Ta_2P_{0.6}Sn_{0.4}O_{7.95}Cl_{0.05}$, $Li_{1.45}Ta_2P_{0.5}Sn_{0.5}O_{7.95}Cl_{0.05}$; $Li_{1.0}Ta_{1.9}W_{0.1}P_{0.9}Si_{0.1}O_8$, $Li_{0.9}Ta_{1.8}W_{0.2}P_{0.9}Si_{0.1}O_8$, $Li_{0.8}Ta_{1.7}W_{0.3}P_{0.9}Si_{0.1}O_8$, $Li_{0.85}Ta_{1.75}W_{0.25}P_{0.9}Si_{0.1}O_8$, $Li_{0.7}Ta_{1.6}W_{0.4}P_{0.9}Si_{0.1}O_8$, $Li_{0.6}Ta_{1.5}W_{0.5}P_{0.9}Si_{0.1}O_8$; $Li_{1.1}Ta_{1.9}W_{0.1}P_{0.8}Si_{0.2}O_8$, $Li_{1.0}Ta_{1.8}W_{0.2}P_{0.8}Si_{0.2}O_8$, $Li_{0.9}Ta_{1.7}W_{0.3}P_{0.8}Si_{0.2}O_8$, $Li_{0.95}Ta_{1.75}W_{0.25}P_{0.8}Si_{0.2}O_8$, $Li_{0.8}Ta_{1.6}W_{0.4}P_{0.8}Si_{0.2}O_8$, $Li_{0.7}Ta_1.W_{0.5}P_{0.8}Si_{0.2}O_8$; $Li_{1.0}Ta_{1.9}Nb_{0.1}P_{0.9}Si_{0.1}O_8$, $Li_{0.9}Ta_{1.8}Nb_{0.2}P_{0.9}Si_{0.1}O_8$, $Li_{0.8}Ta_{1.7}Nb_{0.3}P_{0.9}Si_{0.1}O_8$, $Li_{0.85}Ta_{1.75}Nb_{0.25}P_{0.9}Si_{0.1}O_8$, $Li_{0.7}Ta_{1.6}Nb_{0.4}P_{0.9}Si_{0.1}O_8$, $Li_{0.6}Ta_{1.5}Nb_{0.5}P_{0.9}Si_{0.1}O_8$; $Li_{1.1}Ta_{1.9}Nb_{0.1}P_{0.8}Si_{0.2}O_8$, $Li_{1.0}Ta_{1.8}Nb_{0.2}P_{0.8}Si_{0.2}O_8$, $Li_{0.9}Ta_{1.7}Nb_{0.3}P_{0.8}Si_{0.2}O_8$, $Li_{0.95}Ta_{1.75}Nb_{0.25}P_{0.8}Si_{0.2}O_8$, $Li_{0.8}Ta_{1.6}Nb_{0.4}P_{0.8}Si_{0.2}O_8$, $Li_{0.7}Ta_{1.5}Nb_{0.5}P_{0.8}Si_{0.2}O_8$; $Li_{1.05}Ta_2P_{0.9}Si_{0.1}O_{7.95}Cl_{0.05}$, $Li_{1.0}Ta_2P_{0.9}Si_{0.1}O_{7.9}C_{0.1}$, $Li_{0.9}Ta_{1.75}W_{0.25}PO_8$ or a combination thereof.

In an embodiment, the ion conductivity of the oxide may have improved isotropy.

In many lithium ion conductors, the ionic conductivity is very fast in the z-axis direction, as compared to that in the x-axis and y-axis directions (c(z-axis)>>b(y-axis) & a(x-axis)).

In the oxide according to an embodiment, the anisotropy in ion conduction path and ionic conductivity, which was faster only in c (z-axis) in other lithium ion conductors, may be relaxed to the levels of c(z-axis)>b(y-axis)>a(x-axis). That is, due to the reduction or relaxation of the anisotropy, the isotropy of ionic conductivity may be improved.

As used herein, the expression "isotropy of ionic conductivity" means that the diffusion path of lithium ions is reduced in the order of c(z-axis) direction, b(y-axis) direction, and a(x-axis) direction, so that the difference between the directions is reduced, thus reducing the anisotropy of ion conductivity and improving the isotropy of ion conductivity.

The improved isotropy of ionic conductivity of the oxide according to an embodiment may be shown by the results of calculating the diffusivity (D, unit: $cm^2/S$) and the mean-square displacements (MSD) of the oxide by the diffusion of lithium (Li) ions, before and after introduction of dopants into the oxide, using the nudged elastic band (NEB) model. According to the calculations, the oxide showed an overall increase in lithium ion conductivity values due to the reduction in anisotropy of diffusion paths (mobility increases in a-axis and b-axis), indicating that the oxide exhibits isotropic ionic conductivity characteristics.

In an embodiment, the oxide may have a monoclinic structure having a space group of C2/c. In an embodiment, the oxide may exhibit peaks at diffraction angles (2θ) of 17.5°±0.5°, 24.8°±0.5°, 24.9°±0.5°, 25.4°±0.5°, or 27.8°±0.5°, for example, 17.5°±0.2°, 24.8°±0.2°, 24.9°±0.2°, 25.4°±0.2°, or 27.8°±0.2°, when measured by X-ray diffraction spectroscopy using Cu $K_\alpha$ radiation.

The oxide containing LiX as in Formula 2, such as LiCl, may exhibit shifted X-ray diffraction peak characteristics, as compared to an oxide (where z=0 in Formula 1) not containing LiX, such as LiCl. From the shifted X-ray diffraction peak characteristics, it may be understood that X in LiX substitutes some oxygen (O) sites.

In an embodiment, the oxide as a lithium conductor may have an ionic conductivity at room temperature (25° C.) of about $1\times10^{-2}$ mS/cm or greater, for example, about $1.0\times10^{-1}$ S/cm or greater, for example, about $2.4\times10^{-1}$ S/cm or greater, for example, about $2.6\times10^{-1}$ S/cm or greater, or for example, about $2.8\times10^{-1}$ S/cm or greater. The ionic conductivity may be, for example, about $1\times10^{-2}$ mS/cm to about 10 mS/cm, or about $5\times10^{-2}$ mS/cm to about 1 mS/cm, or about $1\times10^{-1}$ mS/cm to about $8\times10^{-1}$ mS/cm. When the oxide has ionic conductivity in these ranges at room temperature, an electrochemical device, such as an electrochemical battery, including the oxide may have reduced internal resistance.

The oxide may have an electronic conductivity of about $1\times10^{-5}$ mS/cm or less, $1\times10^{-6}$ mS/cm or less, for example, $1\times10^{-8}$ millisiemens per centimeter or smaller at room temperature (25° C.). The electronic conductivity may be, for example, about $1\times10^{-9}$ mS/cm to about $1\times10^{-5}$ mS/cm, or about $1\times10^{-8}$ mS/cm to about $1\times10^{-6}$ mS/cm.

When the oxide is used in a solid electrolyte, according to an embodiment, the solid electrolyte has a high ionic conductivity and a low electronic conductivity, at room temperature.

When the oxide according to an embodiment is used as an electrode additive, the oxide may exhibit an electronic conductivity of about $1\times10^{-5}$ mS/cm or higher, as compared to when used as a solid electrolyte.

The oxide according to an embodiments may be electrochemically stable, for example, at a voltage of about 2 V to about 4 V, with respect to lithium metal (Li/Li$^+$).

In an embodiment, the oxide may have an activation energy of about 0.44 electron volts per atom (eV/atom) or less, for example, about 0.41 eV/atom or less, for example, about 0.37 eV/atom or less, for example, about 0.35 eV/atom or less, for example, about 0.32 eV/atom or less, or, for example, about 0.29 to about 0.41 eV/atom.

The oxide may have a grain size in the range of about 5 nm to about 500 μm. When the compound of Formula 1 includes X, the oxide may have a reduced grain size with improved stability and adhesion between grains.

In an embodiment, the oxide may be in particle form. In an embodiment, the oxide may have an average particle diameter of about 5 nm to about 500 μm, for example, about 100 nm to about 100 μm, or for example, about 1 μm to about 50 μm, and a specific surface area of about 0.01 square meters per gram (m2/g) to about 1000 $m^2/g$, for example, about 0.5 $m^2/g$ to about 100 $m^2/g$.

According to an embodiment, a method of preparing the oxide comprises:

contacting a lithium precursor, a tantalum precursor, an M precursor, a Q precursor, and a phosphorous precursor to obtain a precursor mixture, and heat-treating the precursor mixture in an oxidizing gas atmosphere to prepare the oxide.

The precursor mixture may include a suitable solvent. Any solvent can be used as long as it can dissolve or disperse the lithium precursor, the tantalum precursor, the M precursor, the Q precursor, and the phosphorous precursor. The solvent may be, for example, acetone, ethanol, water, ethylene glycol, isopropanol, or a combination thereof. The amount of the solvent may be in the range of about 50 to 1,000 parts by weight, for example, 100 to 300 parts by weight, with respect to 100 parts by weight of a total weight of the precursor mixture. The mixing may be performed using, for example, milling, blending, or sputtering. The milling may be performed using, for example, a ball mill, an air-jet mill, a bead mill, a roll mill, or a planetary mill.

The heat-treatment of the mixture may be performed at a temperature increase rate of about 1° C./min to 10° C./min, and a heat-treatment temperature ($T_1$) of about 500° C. to about 1200° C., for example, about 600° C. to about 1000° C. When the temperature increase rate in the heat-treatment step is within this range, the heat-treatment may be sufficient.

The heat-treatment may be performed under an oxidizing gas atmosphere. The oxidizing gas atmosphere may contain, for example, air or oxygen. The heat-treatment time may vary depending on the temperature of heat-treatment, and may be, for example, about 1 to about 20 hours, for example, about 1 to about 10 hours, or for example, about 2 to about 8 hours.

The heat-treatment may be performed in two steps, including a first heat-treatment at a first temperature, and a second heat-treatment at a second temperature, wherein the second heat-treatment is performed at a temperature greater than the first heat-treatment. The first heat-treatment may be performed at about 500° C. to about 1000° C., and the second heat-treatment may be performed at about 600° C. to about 1200° C. When the heat-treatment is performed in two steps as described above, an oxide having a high density may be obtained.

After the step of first heat-treatment, an additional step of milling the heat-treatment product may be performed prior to the step of second heat-treatment. Here, the milling may be, for example, planetary milling or hand milling. By performing such additional milling, the particle size of the heat-treatment product may be controlled. By performing milling, the particle size of the heat-treatment product may be controlled, for example, to be about 1 μm or less. By controlling the particle size to be about 1 μm or less, a finally obtained oxide may have improved density.

The lithium precursor may be, for example, lithium oxide, lithium carbonate, lithium chloride, lithium sulfide, lithium nitrate, lithium phosphate, lithium hydroxide, or a combination thereof.

The tantalum precursor may be, for example, tantalum hydroxide, tantalum carbonate, tantalum chloride, tantalum sulfate, tantalum nitrate, tantalum oxide, or a combination thereof.

The phosphorous precursor may be, for example, $(NH_4)_2HPO_4$, $(NH_4)H_2PO_4$, $Na_2HPO_4$, or $Na_3PO_4$.

The M precursor may be, for example, a M element-containing oxide, a M element-containing carbonate, a M element-containing chloride, a M element-containing phosphate, a M element-containing hydroxide, a M element-containing nitrate, or a combination thereof, for example, tungsten oxide, tungsten hydroxide, tungsten chloride, tellurium oxide, tellurium hydroxide, tellurium chloride, selenium oxide, selenium hydroxide, selenium chloride, niobium oxide, niobium hydroxide, or niobium chloride.

The Q precursor may be, for example, a Q element-containing oxide, a Q element-containing carbonate, a Q element-containing chloride, a Q element-containing phosphate, a Q element-containing hydroxide, a Q element-containing nitrate, or a combination thereof, for example, silicon oxide, tin oxide, or tin chloride.

The amount of the lithium precursor, the M precursor, the tantalum precursor, the Q precursor, the phosphorous precursor, and a X precursor may be stoichiometrically selected so as to obtain the oxide represented by Formula 1.

Then, the heat-treatment product may be pulverized to obtain a molded product. The molded product may be, for example, in the form of a powder comprising particles. The molded product obtained by pulverizing may have a size of about 10 μm or less. When the size of the pulverized particles is within this range, the particle size may be small enough to allow sufficient pulverizing and mixing, thus facilitating formation of layered crystal phase.

Subsequently, the molded product may be heat-treated. In the heat-treatment of the molded product, the temperature increase rate may be about 1° C./min to about 10° C./min. The heat-treatment of the molded product may be performed at about 600° C. to about 1100° C., for example, about 1000° C. to about 1100° C. The heat-treatment temperature ($T_2$) of the molded product may be greater than the temperature ($T_1$) of the heat-treatment performed before the molded product is obtained.

In an embodiment, prior to the heat-treatment, the molded product may be processed in pellet form by pressing. When the heat-treatment is performed on the molded product in pellet form, the diffusion distance of the material to be heat-treated may become short, thus facilitating preparation of the desired oxide. When the heat-treatment is performed on the molded product in powder particle form, not in pellet form, due to a longer diffusion distance as compared to that when the heat-treatment is performed on pellets, a longer heat-treatment time and a higher heat-treatment temperature may be used, although it is possible to obtain the oxide.

The heat-treatment of the molded product may be performed, for example, under an oxidizing gas atmosphere, a reducing gas atmosphere, or an inert gas atmosphere. The oxidizing gas atmosphere include air or oxygen. The inert gas atmosphere may include an inert gas such as argon or helium. For example, the reducing gas atmosphere may include a reducing gas such as hydrogen and an inert gas such as argon or helium.

The heat-treatment time of the molded product may vary depending on the heat-treatment temperature ($T_2$) of the molded product, and may be, for example, about 1 to about 50 hours, or for example, about 6 to about 48 hours.

According to an aspect, there is provided an electrochemical device including the oxide. The electrochemical device may be, for example, one selected from an electrochemical battery, a storage battery, a supercapacitor, a fuel cell, a sensor, or an electrochromic device.

According to an aspect, there is provided an electrochemical battery including a cathode, an anode, and a solid electrolyte disposed between the cathode and the anode, wherein the solid electrolyte contains the oxide. The electrochemical battery may include: a cathode, an anode including lithium; and a solid electrolyte disposed between the cathode and the anode, wherein the solid electrolyte contains the oxide.

The electrochemical battery may be a lithium secondary battery, a metal air battery such as a lithium air battery, or an all solid battery. The electrochemical battery may be used in both a primary battery and a secondary battery. The shape of the electrochemical battery is not limited. The electrochemical battery may have any shape of, for example, a coin, a button, a sheet, a stack, a cylinder, a plane, or a horn.

The electrochemical battery according to an embodiment may be used as a medium-large sized battery for electric vehicles.

The electrochemical battery may be, for example, an all-solid battery using a precipitated anode. The precipitated anode may refer to an anode which has an anodeless coating layer without an anode active material at assembly of an electrochemical battery, but on which an anode material such as lithium metal is precipitated after the electrochemical battery is charged.

The solid electrolyte may be an electrolyte protection film, a cathode protection film, an anode protection film, or a combination thereof.

In an embodiment, the solid electrolyte may be used as a cathode protection film in a battery using a sulfide-based solid electrolyte to effectively suppress the reaction between the sulfide-based solid electrolyte and the cathode. In an embodiment, the solid electrolyte may serve as a cathode coating material and a cathode protection film. In an embodiment, the solid electrolyte may be used, due to having a high oxidation potential, as a catholyte, for example, as a catholyte of an all-solid battery.

In an embodiment, the electrochemical battery may be an all-solid battery. The all-solid battery may be an all-solid secondary battery.

Figure 10:
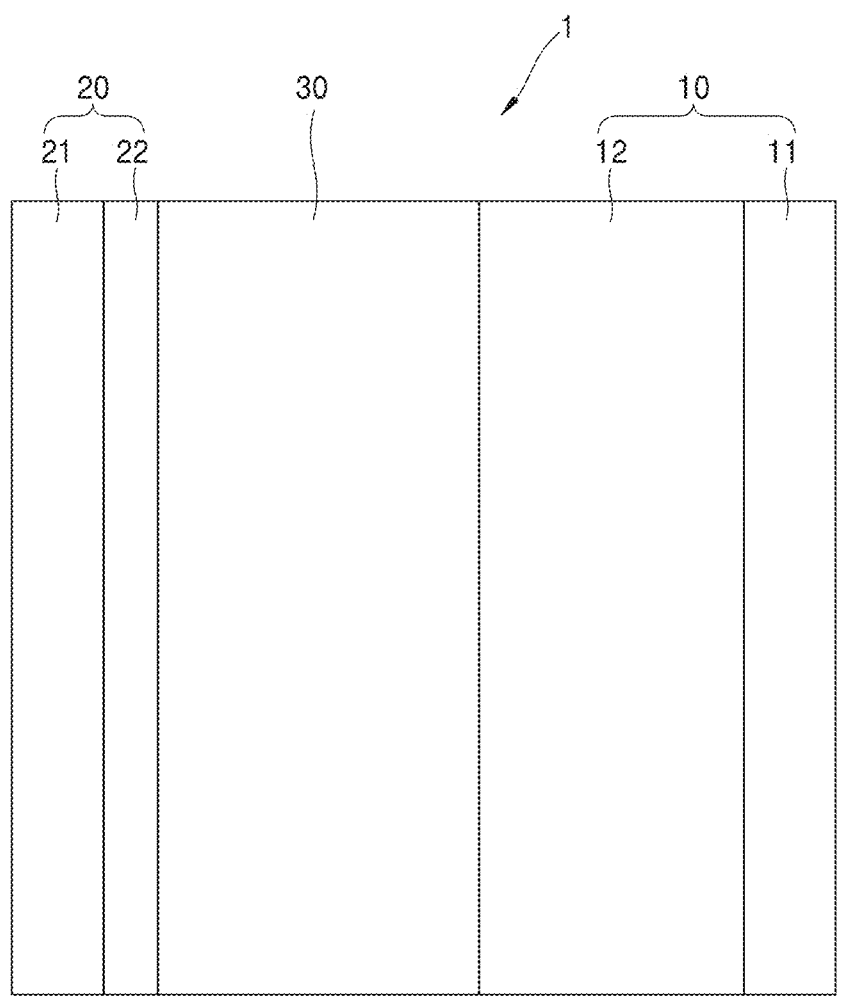
FIGS. 10 to 12 are cross-sectional views illustrating structures of all-solid state batteries.

A structure of an all-solid secondary battery 1 according to an embodiment will be described with reference to FIG. 10. Referring to FIG. 10, the all-solid secondary battery 1 may include a cathode 10, an anode 20, and a solid electrolyte 20 containing the oxide.

The cathode 10 may include a cathode current collector 11 and a cathode active material layer 12. The cathode current collector 11 may have, for example, a body in plate form or foil form consisting of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or a combination thereof. The cathode current collector 11 may be omitted.

The cathode active material layer 12 may include a cathode active material and a solid electrolyte. The solid electrolyte included in the cathode 10 may be similar to or different from that included in the solid electrolyte 30.

The cathode active material may be a cathode active material which is capable of reversibly absorbing and desorbing lithium ions.

For example, the cathode active material may be obtained using, for example, a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, or lithium iron phosphate, nickel sulfide; copper sulfide; lithium sulfide; iron oxide; or vanadium oxide. These cathode active materials may be used alone or in a combination of at least two thereof.

The cathode active material may be, for example, a lithium salt of a ternary transition metal oxide such as $LiNi_xCo_yAl_zO_2$ (NCA) or $LiNi_xCo_yMn_zO_2$(NCM) (wherein $0<x<1$, $0<y<1$, $0<z<1$, and $x+y+z=1$).

The cathode active materials may be covered with a coating layer. In an embodiment, the coating layer of the cathode active material may be any suitable coating layer for the cathode active material of an all-solid secondary battery. For example, the coating layer may be, for example, $Li_2O$-$ZrO_2$.

When the cathode active material is a ternary lithium transition metal oxide such as NCA or NCM, and includes nickel (Ni), the all-solid secondary battery 1 may have increased capacity density, and release of metal in the cathode active material may be reduced in the charged state of the all-solid secondary battery 1. Therefore, long-term reliability and cycle characteristics in the charged stage of the all-solid secondary battery 1 may be improved.

The cathode active material may be in the form of particles having, for example, a true-spherical particle shape or an oval particle shape. The particle diameter of the cathode active material is not limited, and may be in a suitable range for the cathode active material of an all-solid secondary battery. An amount of the cathode active material in the cathode 10 is not limited, and may be in a suitable range applicable to the cathode active material of an all-solid secondary battery.

The cathode 10 may further include, in addition to the cathode active material and the solid electrolyte as described above, an additive(s), for example, a conducting agent, a binder, a filler, a dispersing agent, or an auxiliary ionic conducting agent.

The conducting agent, which may be added to the cathode 10, may be, for example, graphite, carbon black, acetylene black, Ketjen black, carbon fiber or a metal powder. The binder, which may be added to the cathode 10, may be, for example, a styrene-butadiene rubber (SBR), polytetrafluoroethylene (PTFE), polyvinylidene fluoride (PVDF), or polyethylene. The additives such as a filler, a dispersing agent, or an auxiliary ionic conducting, which may be added to the cathode 10, may be any suitable materials used in the cathode of an all-solid secondary battery.

The anode 20 may include an anode current collector 21 and an anodeless coating layer 22. Although the anodeless coating layer 22 is illustrated in FIG. 10, a general anode active material layer may be included.

The anodeless coating layer 22 may contain, for example, semimetal such as silicon, and carbon, and may have a structure with a conductive binder around the metal and the carbon.

The anodeless coating layer 22 may have a thickness of about 1 μm to about 20 μm. The anode current collector 21 may include a material that does not react with lithium, i.e., not form an alloy or compound with lithium. The material of the anode current collector 21 may be, for example, copper (Cu), stainless steel, titanium (Ti), iron (Fe), cobalt (Co), or nickel (Ni). The anode current collector 21 may include a single metal, or an alloy or coating material of at least two metals. The anode current collector 21 may be formed, for example, in a plate or foil form.

Figure 11:
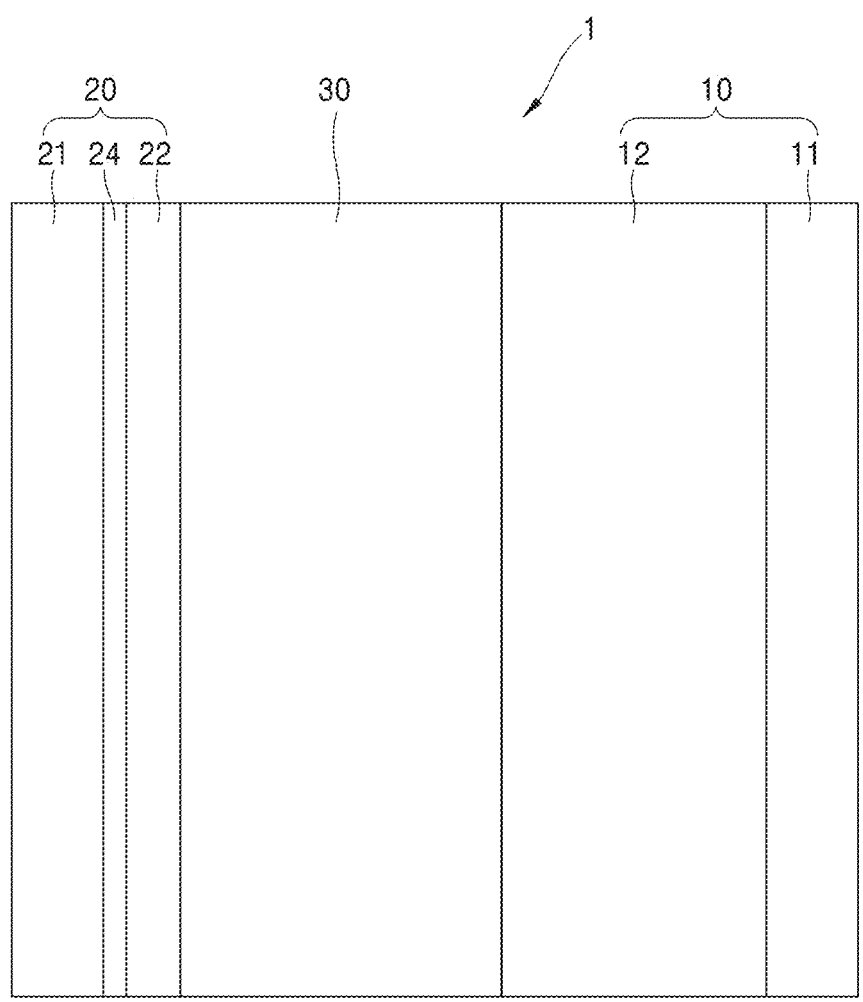
Figure 12:
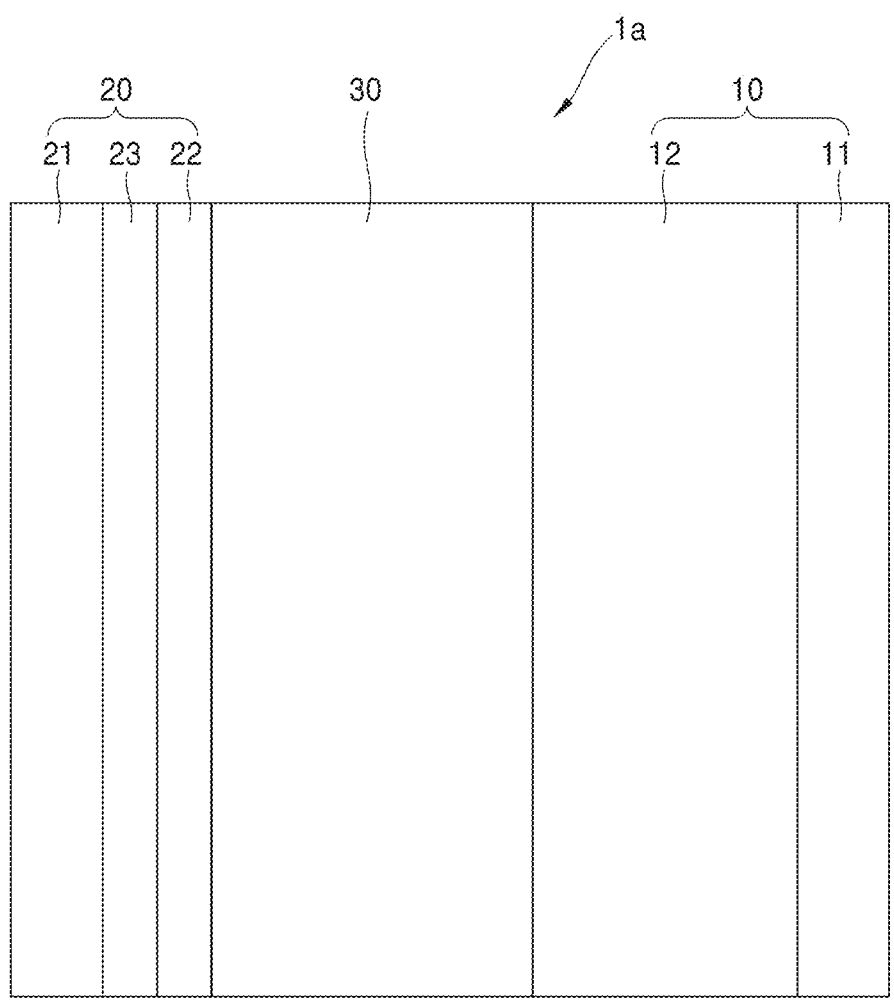

As illustrated in FIG. 11, a thin film 24 may be formed on a surface of the anode current collector 21. The thin film 24 may include an element which is able to form an alloy with lithium. The element which is able to form an alloy with lithium may be, for example, gold (Au), silver (Ag), zinc (Zn), tin (Sn), indium (In), silicon (Si), aluminum (Al), or bismuth (Bi). The thin film 24 may include at least one of the foregoing metals or an alloy of two or more of the metals. When the thin film 24 is present, a metal layer 23 may be precipitated in planar form, as illustrated in FIG. 12, so that the all-solid secondary battery 1a may have improved characteristics.

The thickness of the thin film 24 may be, although not limited, for example, about 1 nm to about 500 nm. When the thickness of the thin film 24 is within this range, the thin film 24 may fully function to allow an appropriate amount of lithium to be precipitated on the anode, so that the all-solid secondary battery 1 may have improved characteristics. The thin film 24 may be formed on the anode current collector 21, for example, by vacuum deposition, sputtering, or plating.

The anodeless coating layer 22 may include an anode active material, which is able to form an alloy or compound with lithium.

The anode active material may be, for example, amorphous carbon, gold (Au), platinum (Pt), palladium (Pd), silicon (Si), silver (Ag), aluminum (Al), bismuth (Bi), tin (Sn), or zinc (Zn). For example, the amorphous carbon may be carbon black (CB), acetylene black (AB), furnace black (FB), ketjen black (KB), or graphene.

The anodeless coating layer 22 may include one or at least two of the anode active materials. For example, the anodeless coating layer 22 may include, as the anode active material, only amorphous carbon or gold (Au), platinum (Pt), palladium (Pd), silicon (Si), silver (Ag), aluminum (Al), bismuth (Bi), tin (Sn), zinc (Zn), or a combination thereof. The anodeless coating layer 22 may include a mixture of amorphous carbon and gold (Au), platinum (Pt), palladium (Pd), silicon (Si), silver (Ag), aluminum (Al), bismuth (Bi), tin (Sn), zinc (Zn), or a combination thereof. A mixed weight ratio of the amorphous carbon and, for example, gold may be, for example, about 10:1 to about 1:2. When the anode active material includes these materials, the all-solid secondary battery 1 may have improved characteristics.

When the anode active material is gold (Au), platinum (Pt), palladium (Pd), silicon (Si), silver (Ag), aluminum (Al), bismuth (Bi), tin (Sn), zinc (Zn), or a combination thereof, a particle size (for example, an average particle diameter) of the anode active material may be about 4 μm or less. The all-solid secondary battery 1 may have improved characteristics. The particle diameter of the anode active material may be, for example, a median diameter (D50) measured using a laser particle size distribution analyzer. In the examples and comparative examples, the particle diameter was measured using this method. The lower limit of the particle diameter may be, although not limited, about 10 nm.

The anode active material may include a mixture of first particles of amorphous carbon and second particles of a metal or semiconductor. The metal or semiconductor may include, for example, gold (Au), platinum (Pt), palladium (Pd), silicon (Si), silver (Ag), aluminum (Al), bismuth (Bi), tin (Sn), zinc (Zn), or a combination thereof. The amount of the second particles may be about 8 weight percent (wt %) to about 60 wt %, or about 10 wt % to about 50 wt %, based on a total weight of the mixture. The all-solid secondary battery 1 may have improved characteristics when the amount of the second particles is in this range.

The thickness of the anodeless coating layer 22 is not specifically limited, and may be about 1 μm to about 20 μm. When the thickness of the anodeless coating layer 22 is within this range, the all-solid secondary battery 1 may have improved characteristics. When a binder is used, a thickness of the anodeless coating layer 22 may be easily in the foregoing range.

The anodeless coating layer 22 may include a mixture of additives in an appropriate ratio, for example, a filler, a dispersing agent, or an ionic conducting agent, which are suitable in an all-solid battery.

The solid electrolyte may include a solid electrolyte containing the oxide alone or in addition to a commercially available solid electrolyte.

The commercially available solid electrolyte may include, for example, a sulfide-based solid electrolyte material. The sulfide-based solid electrolyte material may be, for example, $Li_2S-P_2S_5$, $Li_2S-P_2S_5-LiX$ (wherein X is a halogen, for example, I or Cl), $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-ZmSn$ (wherein m and n may be a positive number, and Z may be Ge, Zn, Ga, or a combination thereof), or $Li_2S-GeS_2$, $Li_2S-SiS_2-Li_3PO_4$, $Li_2S-SiS_2-Li_pMO_q$ (wherein p and q are a positive number, and M may be one of P, Si, Ge, B, Al, Ga and In). The sulfide-based solid electrolyte material may be prepared by treating, for example, melt quenching or mechanical milling, a starting material (for example, $Li_2S$ or $P_2S_5$). The treatment may be followed by heat-treatment. The solid electrolyte may be in an amorphous state, a crystalline state, or in a mixed state thereof.

As the solid electrolyte, a sulfide-based solid electrolyte material including at least sulfur (S), phosphorous (P), and lithium (Li), among the sulfide-based solid electrolyte materials, may be used. For example, a sulfide-based solid electrolyte material including $Li_2S-P_2S_5$ may be used. When a sulfide-based solid electrolyte material including $Li_2S-P_2S_5$ is used as the solid electrolyte, a mixed molar ratio ($Li_2S:P_2S_5$) of $Li_2S$ and $P_2S_5$ may be in a range of about 50:50 to about 90:10. The solid electrolyte 30 may further include a binder. The binder which may be included in the solid electrolyte 30 may be, for example, styrene butadiene rubber (SBR), polytetrafluoroethylene, polyvinylidene fluoride, or polyethylene. The binder of the solid electrolyte 30 may be the same as or different from the binder of the cathode active material layer 12 and the anodeless coating layer 22. Embodiments of the present disclosure will now be described in detail with reference to the following examples and comparative examples. However, these examples are only for illustrative purposes and are not intended to limit the scope of the embodiments of the present disclosure

EXAMPLES

Example 1

LiOH as a lithium precursor, $Ta_2O_5$ as a tantalum precursor, $WO_3$ as a tungsten precursor, and $(NH_4)_2HPO_4$ as a phosphorous precursor were mixed in a stoichiometric ratio according to the composition as shown in Table 1, and then mixed with acetone while pulverizing with a planetary mill containing zirconia balls for about 2 hours to thereby obtain a precursor mixture. The amount of acetone was about 100 parts by weight with respect to 100 parts by weight of a total weight of the precursor mixture, and LiOH was used in an excess of about 10 wt % in the preparation of the precursor mixture in order to compensate in advance for the loss during a subsequent heat-treatment of the precursor mixture.

The precursor mixture was heated to about 600° C. at a temperature increase rate of about 5° C./min, and then subjected to a first heat-treatment at the same temperature under the air atmosphere for about 8 hours.

The powder after the first heat-treatment performed was subjected to planetary milling for about 10 minutes.

The resulting product was heated to 1000° C. at a temperature increase rate of about 5° C./min, and then subjected to a second heat-treatment at the same temperature under the air atmosphere for about 8 hours, to thereby obtain oxide powder having the composition shown in Table 1.

Examples 2-3

Oxide powders having the compositions as shown in Table 1 were prepared in the same manner as in Example 1, except that lithium chloride (LiCl) was further added in preparing the precursor mixture. The amounts of lithium chloride in Examples 2 and 3 were selected in stoichiometric ratios according to the respective compositions of Table 1.

Examples 4

Oxide powders having the compositions as shown in Table 1 were prepared in the same manner as in Example 1, except that the amount of the tungsten precursor $WO_3$ was stoichiometrically selected so as to obtain the oxide powders having the respective compositions of Table 1.

Example 5

LiOH as a lithium precursor, $Ta_2O_5$ as a tantalum precursor, $(NH_4)_2HPO_4$ as a phosphorous precursor, and $SiO_2$ as a silicon precursor were mixed in a stoichiometric ratio according to the composition as shown in Table 1, and then mixed with acetone while pulverizing with a planetary mill containing zirconia balls for about 2 hours to thereby obtain a precursor mixture. The amount of acetone was about 100 parts by weight with respect to 100 parts by weight of a total weight of the precursor mixture, and LiOH was used in an excess of about 10 wt % in the preparation of the precursor mixture in order to compensate in advance for the loss during a subsequent heat-treatment of the precursor mixture.

The precursor mixture was heated to about 600° C. at a temperature increase rate of about 5° C./min, and then subjected to a first heat-treatment at the same temperature under the air atmosphere for about 8 hours.

The powder after the first heat-treatment performed was subjected to planetary milling for about 10 minutes.

The resulting product was heated to 1000° C. at a temperature increase rate of about 5° C./min, and then subjected to a second heat-treatment at the same temperature under the air atmosphere for about 8 hours, to thereby obtain oxide powder having the composition shown in Table 1.

Examples 6-7

Oxide powders having the compositions as shown in Table 1 were prepared in the same manner as in Example 5, except that lithium chloride (LiCl) was further added in preparing the precursor mixture. The amounts of lithium chloride in Examples 6 and 7 were selected in stoichiometric ratios according to the respective compositions of Table 1.

Examples 8-9

Oxide powders were prepared in the same manner as in Example 5, except that the amount of the silicon precursor $SiO_2$ was selected so as to obtain the oxide powers having the respective compositions of Table 1.

Example 10

Oxide powder ($Li_{0.75}Ta_{1.75}W_{0.25}PO_8$) was prepared in the same manner as in Example 1, except that the amount of the tungsten precursor ($WO_3$) was selected so as to obtain the oxide powder having the composition of Table 1.

Example 11

Oxide powder ($Li_{0.5}Ta_{1.5}W_{0.5}PO_8$) was prepared in the same manner as in Example 1, except that the amount of the lithium precursor, the tantalum precursor, the tungsten precursor, and the phosphorous precursor was selected so as to obtain the oxide power having the composition of Table 1.

Comparative Example 1

Oxide powder was prepared in the same manner as in Example 1, except that LiOH as a lithium precursor, $Ta_2O_5$ as a tantalum precursor, and $(NH_4)_2HPO_4$ as a phosphorous precursor was used as the precursor, and the amount of the lithium precursor, the tantalum precursor, and the phosphorous precursor was selected so as to obtain the oxide power having the composition of Table 1.

Comparative Example 2

Oxide powder was prepared in the same manner as in as in Comparative Example 1, except that $SiO_2$ as a silicon precursor was further used, and the amount of the lithium precursor, the tantalum precursor, and the silicon precursor was selected so as to obtain the oxide power having the composition of Table 1.

Comparative Example 3

Oxide powder was prepared in the same manner as in Comparative Example 2, except that $WO_3$ as a tungsten precursor was further used and the amount of the lithium precursor, the tantalum precursor, the silicon precursor, and the tungsten precursor was selected so as to obtain the oxide power having the composition of Table 1.Table 1.

TABLE 1

| Example | Composition |
| --- | --- |
| Example 1 | $Li_{0.9}Ta_{1.9}W_{0.1}PO_8$ |
| Example 2 | $Li_{0.8}Ta_{1.9}W_{0.1}PO_{7.9}Cl_{0.1}$ |
| Example 3 | $Li_{0.85}Ta_{1.9}W_{0.1}PO_{7.95}Cl_{0.05}$ |
| Example 4 | $Li_{0.8}Ta_{1.8}W_{0.2}PO_8$ |
| Example 5 | $Li_{1.1}Ta_2P_{0.9}Si_{0.1}O_8$ |
| Example 6 | $Li_{1.0}Ta_2P_{0.9}Si_{0.1}O_{7.9}Cl_{0.1}$ |
| Example 7 | $Li_{1.05}Ta_2P_{0.9}Si_{0.1}O_{7.95}Cl_{0.05}$ |
| Example 8 | $Li_{1.2}Ta_2P_{0.8}Si_{0.2}O_8$ |
| Example 9 | $Li_{1.5}Ta_2P_{0.5}Si_{0.5}O_8$ |
| Example 10 | $Li_{0.75}Ta_{1.75}W_{0.25}PO_8$ |
| Example 11 | $Li_{0.5}Ta_{1.5}W_{0.5}PO_8$ |

TABLE 1-continued

| Example | Composition |
| --- | --- |
| Comparative Example 1 | $LiTa_2PO_8$ |
| Comparative Example 2 | $Li_2Ta_2SiO_8$ |
| Comparative Example 3 | $LiTaWSiO_8$ |

Example 12: Preparation of Oxides

LiOH as a lithium precursor, $Ta_2O_5$ as a tantalum precursor, $WO_3$ as a tungsten precursor, $(NH_4)_2HPO_4$ as a phosphorous precursor, and $SiO_2$ as a silicon precursor were mixed in stoichiometric ratios according to the compositions as shown in Table 2, and then mixed with acetone while pulverizing with a planetary mill containing zirconia balls for about 2 hours to thereby obtain precursor mixtures. The amount of acetone was about 100 parts by weight with respect to 100 parts by weight of a total weight of the precursor mixture, and LiOH was used in an excess of about 10 wt % in the preparation of each precursor mixture in order to compensate in advance for the loss during a subsequent heat-treatment of the precursor mixture.

The precursor mixture was heated to about 600° C. at a temperature increase rate of about 5° C./min, and then subjected to a first heat-treatment at the same temperature under the air atmosphere for about 8 hours.

The powder after the first heat-treatment performed as described above was subjected to planetary milling for about 10 minutes.

The resulting product was heated to 1000° C. at a temperature increase rate of about 5° C./min, and then subjected to a second heat-treatment at the same temperature under the air atmosphere for about 8 hours, to thereby obtain oxide powders having the compositions shown in Table 2.

TABLE 2

| Oxide | Composition of oxide |
| --- | --- |
| 12-1 | $Li_{1.0}Ta_{1.9}W_{0.1}P_{0.9}Si_{0.1}O_8$ |
| 12-2 | $Li_{0.9}Ta_{1.8}W_{0.2}P_{0.9}Si_{0.1}O_8$ |
| 12-3 | $Li_{0.8}Ta_{1.7}W_{0.3}P_{0.9}Si_{0.1}O_8$ |
| 12-4 | $Li_{1.1}Ta_{1.9}W_{0.1}P_{0.8}Si_{0.2}O_8$ |
| 12-5 | $Li_{1.0}Ta_{1.8}W_{0.2}P_{0.8}Si_{0.2}O_8$ |
| 12-6 | $Li_{0.9}Ta_{1.7}W_{0.3}P_{0.8}Si_{0.2}O_8$ |

Evaluation Example 1: Evaluation of XRD Spectrum

X-ray diffraction (XRD) spectra of the oxides according to Example 5, Example 6, Example 8, Example 9, Comparative Example 1, and Comparative Example 2 were evaluated. The results are shown in FIG. 1. The XRD analysis was performed using a Bruker's D8 Advance with Cu Kα radiation to obtain the XRD spectra.

Referring to FIG. 1, the oxides of Example 5, Example 6, Example 8, and Example 9 were found to exhibit the same XRD peak characteristics as those of the oxides of Comparative Examples 1 and 2. From these results, it is understood that the oxides of Example 5, Example 6, Example 8, and Example 9 had substantially the same crystalline structure as that of the oxides of Comparative Examples 1 and 2.

Evaluation Example 2: Measurement of Ionic Conductivity and Activation Energy The oxide powders of Example 1, Example 2, Example 4, Example 5, Example 6, Example 8, Example 9, Comparative Example 1, and Comparative Example 2 were pelletized by pressing with a pressure of about 6 tons for about 5 minutes to thereby form pellets of each oxide (having a thickness: about 500 μm). The surfaces of the oxide pellets obtained were fully covered with mother powder having the same composition as the pellets of each oxide to minimize a compositional change resulting from volatilization of lithium during heat-treatment, and then heat-treated at about 1100° C. for about 12 hours. Both sides of the heat-treated pellets were polished using a SiC sandpaper so as to adjust the thickness of the pellets to about 500 um, and then Au electrodes were deposited on the both sides of the pellets by sputtering, to thereby manufacture an Au/oxide pellet/Au structure.

Figure 4A:
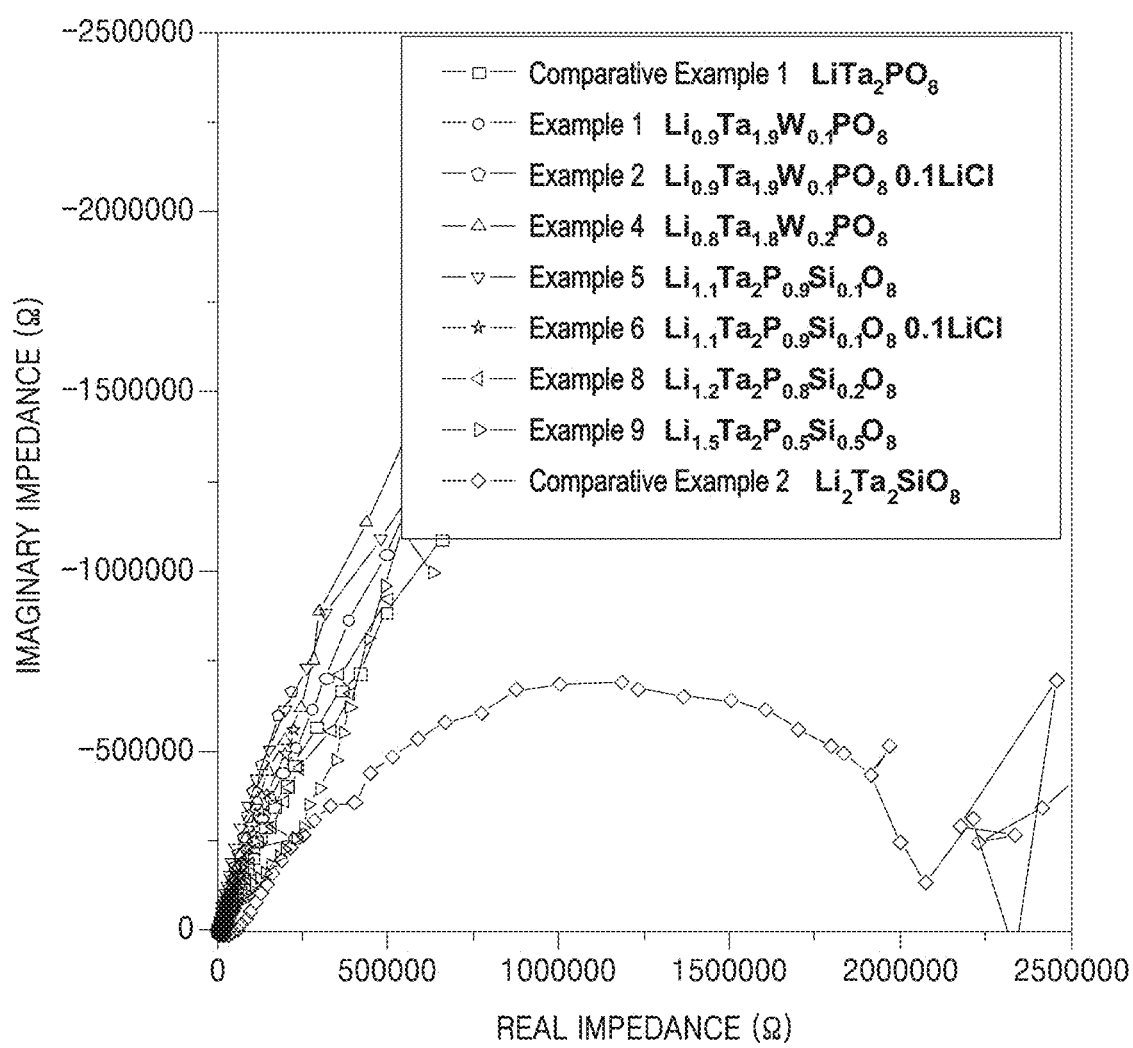
FIG. 4A is a graph of imaginary impedance ($Z_{im}/\Omega$) versus real impedance ($Z_{re}/\Omega$) and illustrates ionic conductivity characteristics of the oxides of Examples 1, 2, 4, 5, 6, 8 and 9 and Comparative Examples 1 and 2, when analyzed using electrochemical impedance spectroscopy.
Figure 4B:
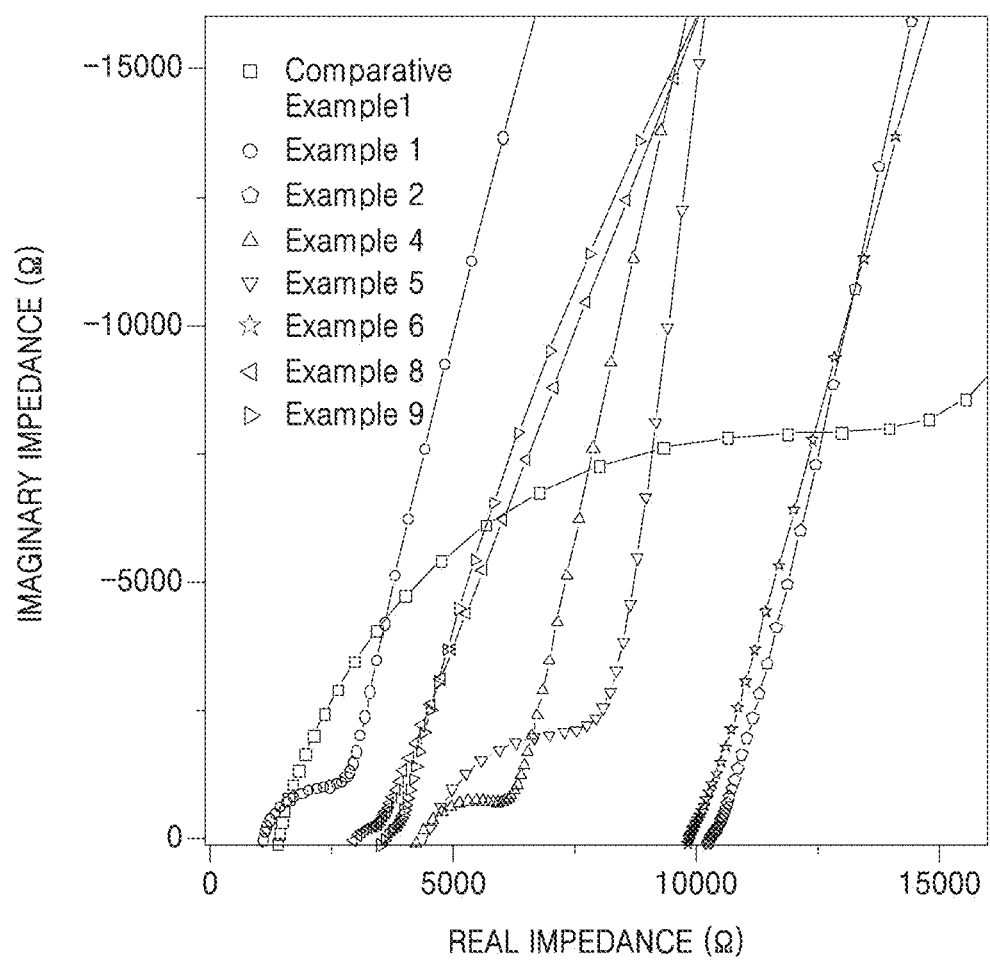
FIG. 4B is a graph of imaginary impedance ($Z_{im}/\Omega$) versus real impedance ($Z_{re}/\Omega$) and illustrates an enlarged view of a portion of FIG. 4A.

The Au/oxide pellet/Au structure was analyzed using electrochemical impedance spectroscopy (EIS). This EIS analysis was performed at an amplitude of about 10 mV and a frequency of about 0.1 hertz (Hz) to 106 Hz. The results of the EIS analysis are shown in FIGS. 4A and 4B and Table 3. From the impedance measurement results, a total resistance value ($R_{total}$) was obtained. The electrode area and the pellet thickness was corrected using this value, to thereby calculate conductivity values. From the results of the EIS analysis performed while the temperature of a chamber in which each oxide sample was loaded was varied, the activation energy (Ea) for conduction of lithium ions was calculated. The conductivity values measured at different temperature in the range of 298 K to 378 K were used in the Arrhenius plot (Ln (σT) vs. 1/T) of Equation 1, to thereby calculate the activation energy (Ea) from the slopes.

$$\sigma T = A^{(Ea/RT)} \quad \text{Equation 1}$$

In Equation 1, Ea indicates the activation energy, T indicates the absolute temperature, A indicates the pre-exponential factor, a indicates a conductivity, and R indicates a gas constant.

Figure 5:
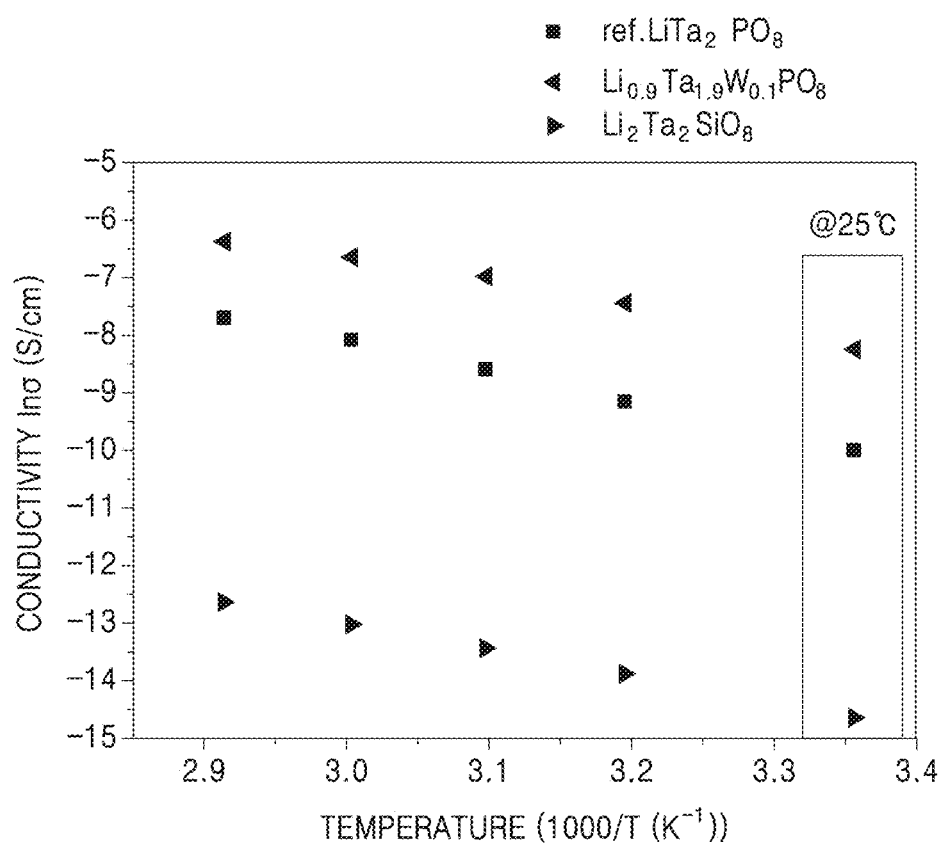
FIG. 5 is a graph of conductivity (Siemens per centimeter (S/cm)) versus temperature (1000/Kelvin ($K^{-1}$)) and shows the activation energies of the oxides of Examples 1 to 9 and the oxides of Comparative Examples 1 to 3.

The activation energy analysis results obtained are shown in FIG. 5 and Table 3.

include $LiTaO_3$ having a perovskite phase. When the oxides have this phase, lithium stability may be improved.

Referring to Table 3, the oxides of Examples 1 to 9 were found to have improved room temperature (25° C.) ionic conductivity, as compared to that of the oxides of Comparative Examples 1 to 3. The ionic conductivity of the oxide of Comparative Example 3 was out of the measurable range, and is not available.

The oxides of Examples 1 to 9 exhibited a smaller activation energy compared with that of the oxides of Comparative Examples 1 to 3. The oxides of Examples 1 to 9 exhibited an activation energy of about 0.41 eV/atom or smaller, Such a reduced activation energy of an oxide may result in improved ionic conductivity at low temperature.

Evaluation Example 3: Lithium Stability

The oxide powers of Example 1, Example 5, and Comparative Example 1 were pelletized by pressing with a pressure of about 6 tons for about 5 minutes, to thereby obtain pellets of each oxide (having a thickness of about 500 μm). The surfaces of the oxide pellets obtained through the above-described processes were fully covered with mother powder having the same composition as the pellets of each oxide to minimize a compositional change resulting from volatilization of lithium during heat-treatment, and then heat-treated under the air atmosphere at about 1100° C. for about 12 hours. Both sides of the heat-treated pellets were polished using a SiC sandpaper so as to adjust the thickness of the pellets to about 500 um, and then lithium metals were arranged on the both sides of the pellets, respectively, and then subjected to cold isostatic pressing (CIP), to thereby manufacture a lithium (Li) symmetric cell.

After the manufacture of the lithium symmetric cells, the lithium symmetric cells were left at room temperature for 3 days, and impedance characteristics of each cell were evaluated. The results are shown in FIG. 6.

Figure 6:
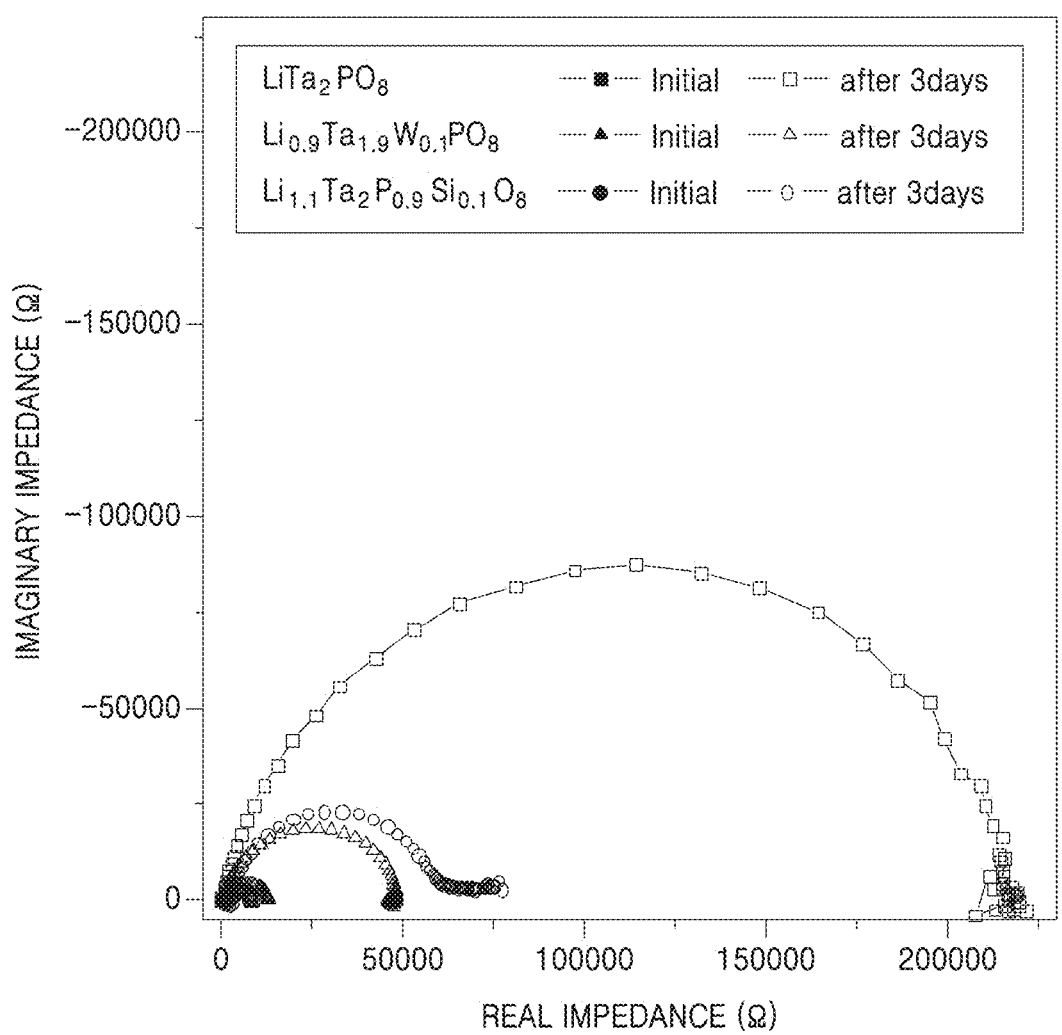
FIG. 6 is a graph of imaginary impedance ($Z_{im}/\Omega$) versus real impedance ($Z_{re}/\Omega$) and shows the lithium stability of lithium symmetric cells respectively containing the oxide of Example 1, Example 5, and Comparative Example 1.

Referring to FIG. 6, the lithium symmetric cells using the oxides of Examples 1 and 5, respectively, were found to exhibit a smaller variation in resistance due to significantly suppressed reaction with lithium metal after being left at

TABLE 3

| Example | Composition | Crystal structure (XRD) | σ(mS/cm @25° C.) Li+, bulk | σ(mS/cm @25° C.) Li+, g.b. | σ(mS/cm @25° C.) Li+, tot | Ea (eV/atom) |
|---|---|---|---|---|---|---|
| Example 1 | $Li_{0.9}Ta_{1.9}W_{0.1}PO_8$ | $LiTa_2PO_8$ | $9.2 \times 10^{-1}$ | $3.7 \times 10^{-1}$ | $2.6 \times 10^{-1}$ | 0.37 |
| Example 2 | $Li_{0.8}Ta_{1.9}W_{0.1}PO_{7.9}Cl_{0.1}$ | $LiTa_2PO_8$ | $1.0 \times 10^{-1}$ | — | $1.0 \times 10^{-1}$ | 0.29 |
| Example 3 | $Li_{0.85}Ta_{1.9}W_{0.1}PO_{7.95}Cl_{0.05}$ | $LiTa_2PO_8$ | $5.7 \times 10^{-1}$ | $3.1 \times 10^{-1}$ | $2.0 \times 10^{-1}$ | 0.4 |
| Example 4 | $Li_{0.8}Ta_{1.8}W_{0.2}PO_8$ | $LiTa_2PO_8$ | $2.3 \times 10^{-1}$ | $4.1 \times 10^{-1}$ | $1.5 \times 10^{-1}$ | 0.35 |
| Example 5 | $Li_{1.1}Ta_2P_{0.9}Si_{0.1}O_8$ | $LiTa_2PO_8$ | $2.3 \times 10^{-1}$ | $1.7 \times 10^{-1}$ | $9.9 \times 10^{-2}$ | 0.41 |
| Example 6 | $Li_{1.0}Ta_2P_{0.9}Si_{0.1}O_{7.9}Cl_{0.1}$ | $LiTa_2PO_8$ | $7.5 \times 10^{-2}$ | — | $7.5 \times 10^{-2}$ | 0.31 |
| Example 7 | $Li_{1.05}Ta_2P_{0.9}Si_{0.1}O_{7.95}Cl_{0.05}$ | $LiTa_2PO_8$ | $1.4 \times 10^{-1}$ | $1.8 \times 10^{-1}$ | $9.7 \times 10^{-2}$ | 0.39 |
| Example 8 | $Li_{1.2}Ta_2P_{0.8}Si_{0.2}O_8$ | $LiTa_2PO_8 + LiTaO_3$ | $3.4 \times 10^{-1}$ | $8.3 \times 10^{-1}$ | $2.4 \times 10^{-1}$ | 0.36 |
| Example 9 | $Li_{1.5}Ta_2P_{0.5}Si_{0.5}O_8$ | $LiTa_2PO_8 + LiTaO_3$ | $2.8 \times 10^{-1}$ | — | $2.8 \times 10^{-1}$ | 0.32 |
| Comparative Example 1 | $LiTa_2PO_8$ | $LiTa_2PO_8$ | $7.2 \times 10^{-1}$ | $4.6 \times 10^{-2}$ | $4.6 \times 10^{-2}$ | 0.45 |
| Comparative Example 2 | $Li_2Ta_2SiO_8$ | $LiTaO_3 + LiTaSiO_5$ | $1.5 \times 10^{-2}$ | $4.5 \times 10^{-4}$ | $4.4 \times 10^{-4}$ | 0.40 |
| Comparative Example 3 | $LiTaWSiO_8$ | $LiTa_3O_8 + Li_2WO_4$ + unknown | Not available | | | — |

In Table 3, Li+,bulk indicates the lithium ion bulk conductivity, Li+, g.b. denotes the lithium ion grain boundary conductivity, and Li+, tot indicates the total lithium ion conductivity. The oxides of Example 8 and Example 9 room temperature for 3 days, as compared with the lithium symmetric cell using the oxide of Comparative Example 1.

Figure 7A:
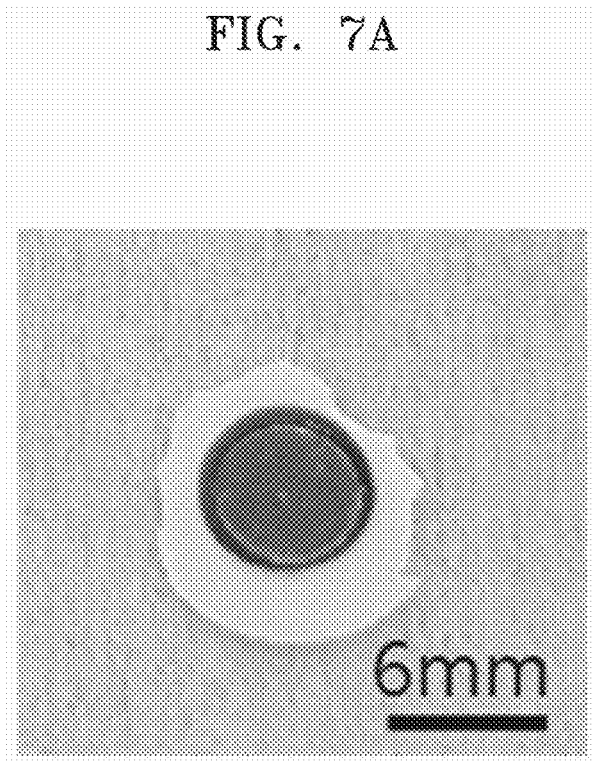
FIG. 7A is an image showing a state change in a lithium symmetric cell using the oxide of Example 1 after standing for 3 days.
Figure 7B:
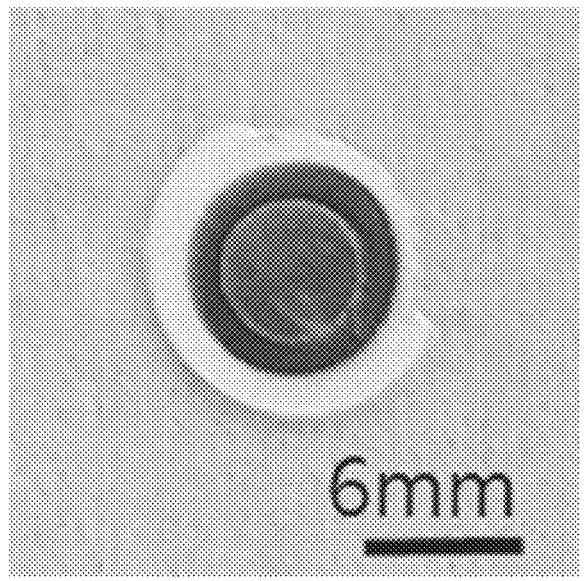
FIG. 7B is an image showing a state change in a lithium symmetric cell using the oxide of Comparative Example 1 after standing for 3 days.

The state changes in the lithium symmetric cell using the oxide of Example 1 and the lithium symmetric cell using the oxide of Comparative Example 1 after being left for 3 days are shown in FIGS. 7A and 7B, respectively. FIGS. 7A and 7B show the state changes in the lithium symmetric cell using the oxide of Example 1 and the lithium symmetric cell using the oxide of Comparative Example 1, respectively.

Referring to FIGS. 7A and 7B, the lithium symmetric cell using the oxide of Example 1 was found to exhibit less discoloration of lithium, as compared with the lithium symmetric cell using the oxide of Comparative Example 1.

From the above-described results of FIGS. 6, 7A and 7B, the oxides of Example 1 and Example 5 were found to exhibit improved lithium stability, as compared with the oxide of Comparative Example 1.

Evaluation Example 4: Calculation of Activation Energy and Mean-Square Displacement (MSD) (Calculated Values)

The diffusivity (D, unit: cm2/S) of each oxide by diffusion of lithium ions was calculated before and after introduction of dopants into the oxides of Example 9, Example 10, Comparative Example 1, and Comparative Example 2, using the nudged elastic band (NEB) method. The results are shown in FIGS. 2A and 2D, respectively.

Figure 2A:
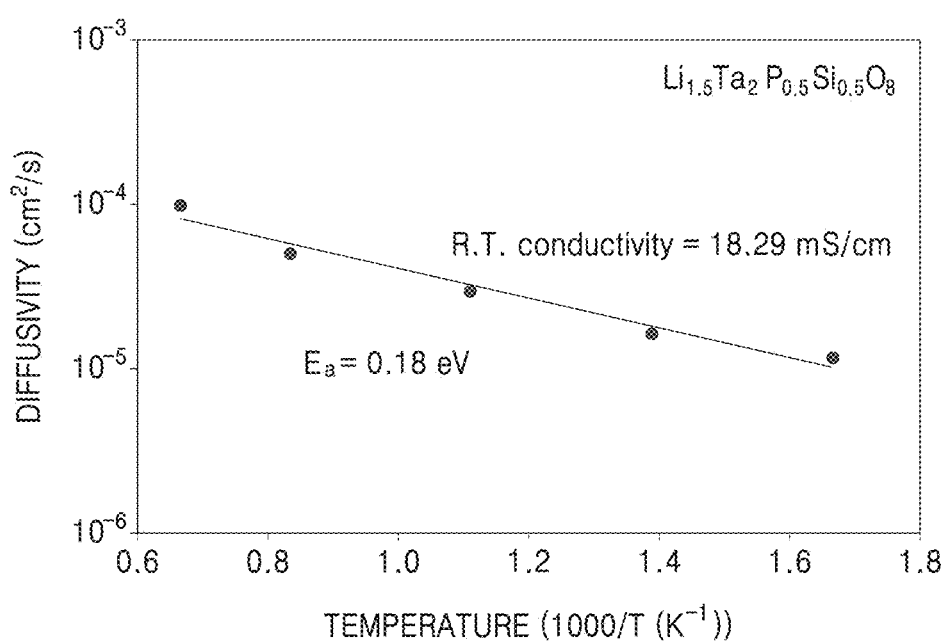
FIGS. 2A to 2D are each a graph of diffusivity (square centimeters per second, (cm²/s)) versus temperature (1000/T (K⁻¹)) of the oxides of Example 9, Example 10, Comparative Example 1, and Comparative Example 2, respectively, and are each an Arrhenius plot to illustrate diffusion of lithium ions, before and after introduction of dopants into each oxide.
Figure 2B:
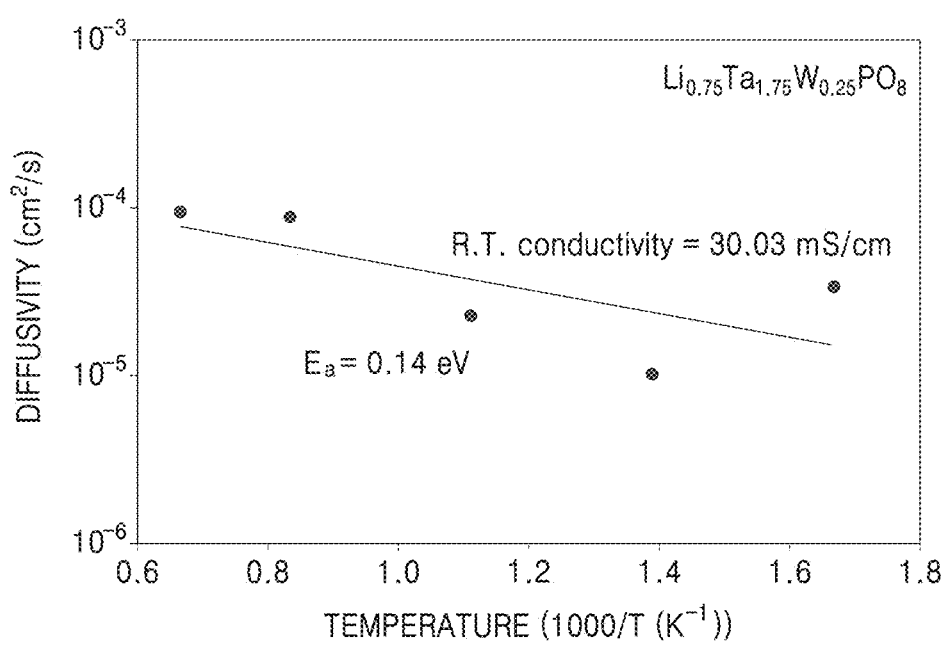
Figure 2C:
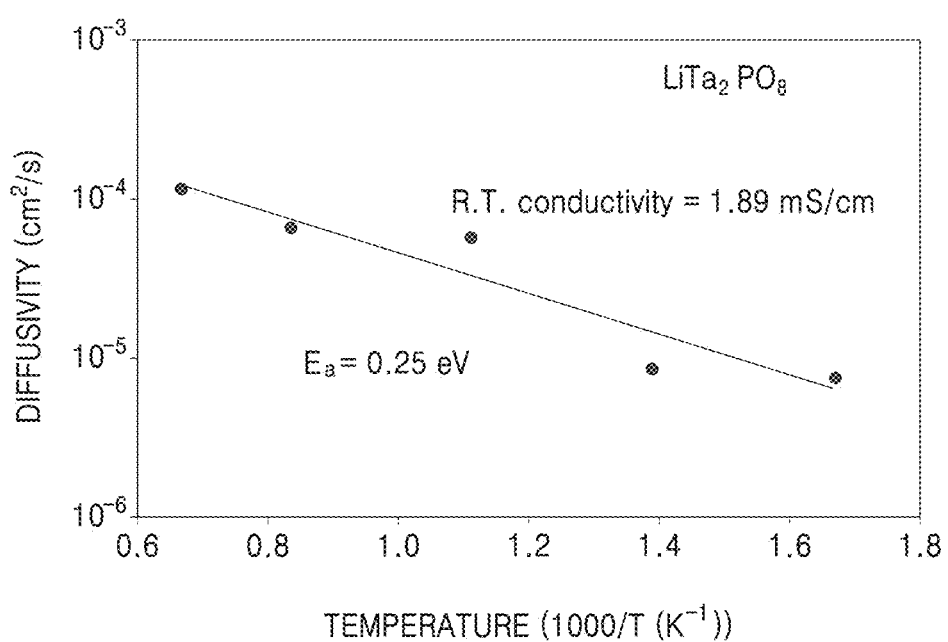
Figure 2D:
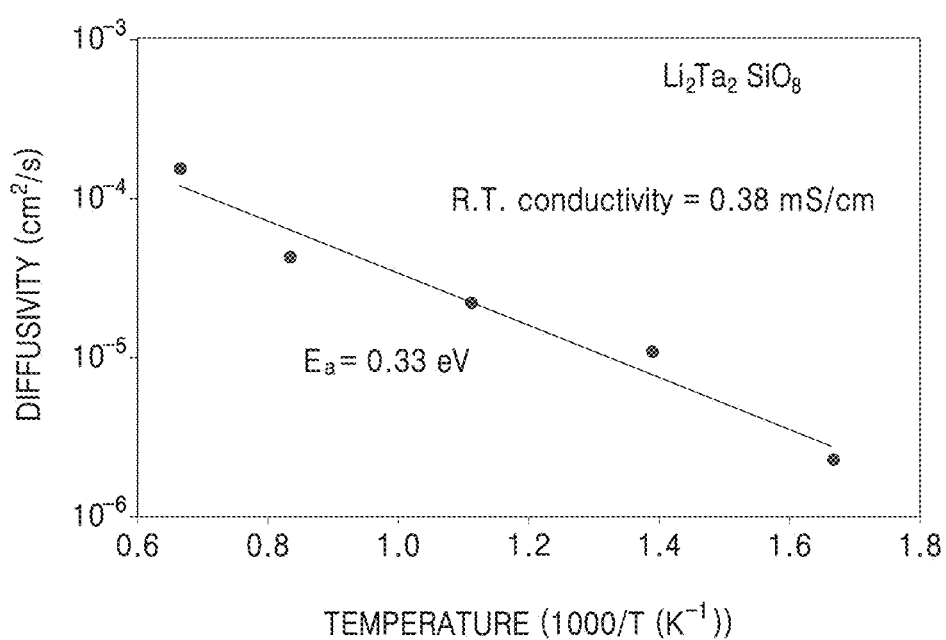

As shown in FIGS. 2A and 2B, the oxides of Example 9 and Example 10 were found to exhibit greatly increased ionic conductivity, as compared with those of the oxides of Comparative Example 1 and Comparative Example 2 as shown in FIGS. 2C and 2D, respectively. From these results, it was found that the oxides of Example 9 and Example 10 had increased isotropy of ion conduction paths, unlike the oxides of Comparative Examples 1 and 2.

Figure 3A:
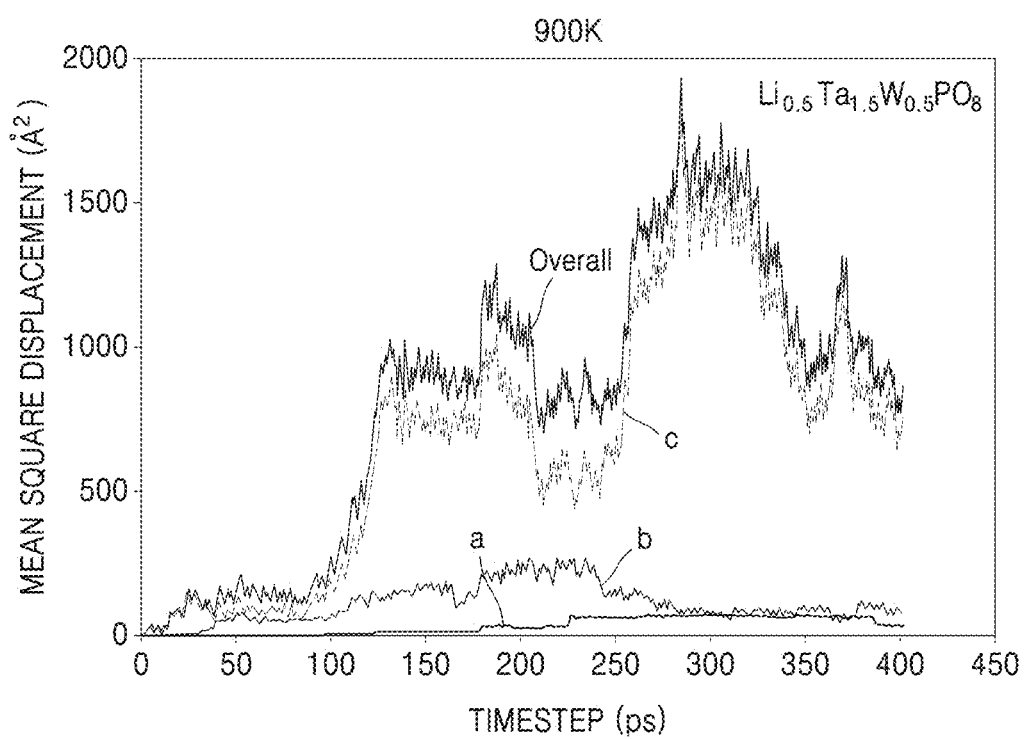
FIGS. 3A to 3C are each a graph of mean-square displacement (MSD (Å²)) versus timestep (picoseconds (ps)) of the oxides of Examples 11 and 9 and Comparative Example 1, respectively, and illustrate the diffusion of Li ions, before and after introduction of a dopant into each oxide.
Figure 3B:
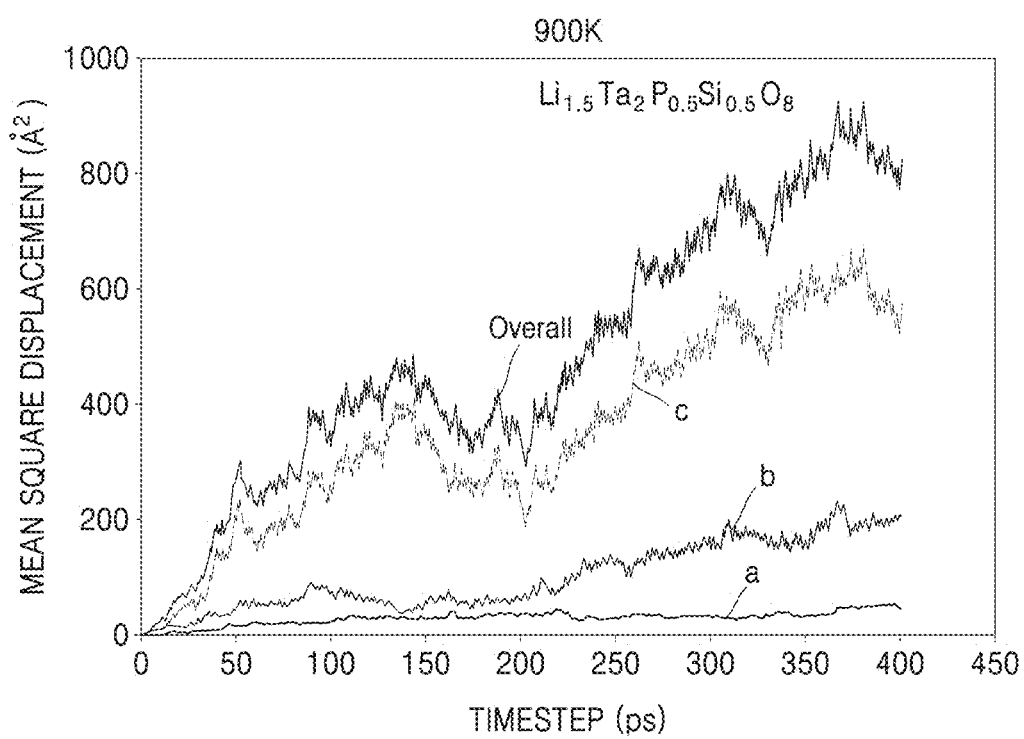
Figure 3C:
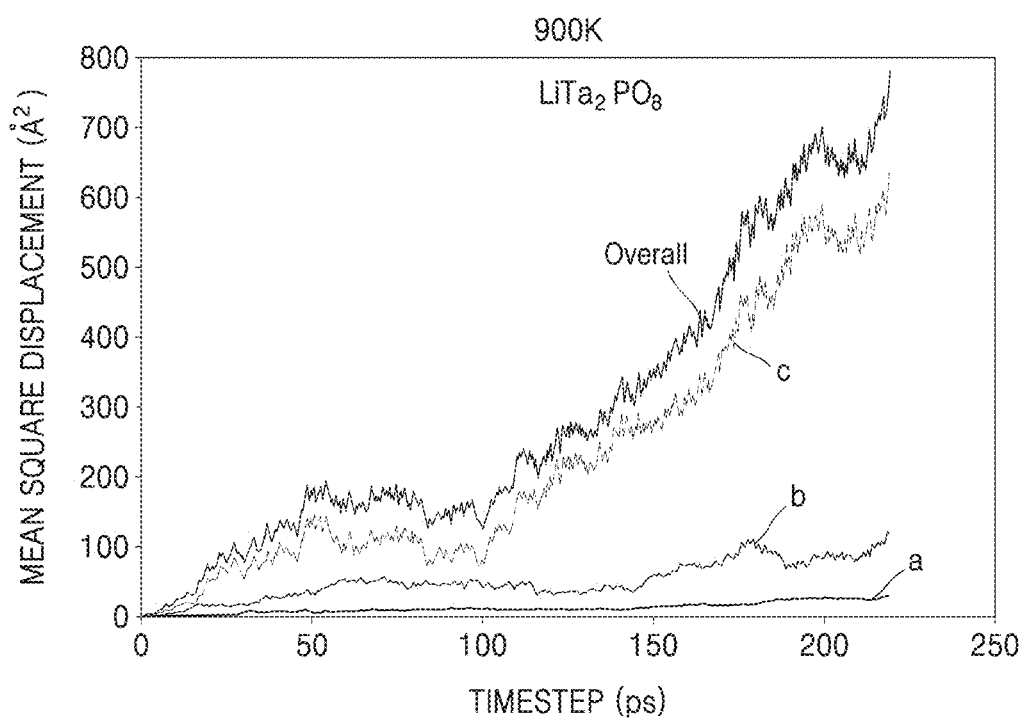

Mean-square displacements (MSD) by the diffusion of lithium ions in the oxides of Examples 9 and 11 and Comparative Example 1, before and after the introduction of dopants into each oxide, were calculated using the nudged elastic band (NEB) calculating method, and the results are shown in FIGS. 3A to 3C, respectively. In FIGS. 3A to 3C, "a" indicates the MSD in the x-axis, "b" indicates the MSD in the y-axis, "c" indicates the MSD in the z-axis, and "Overall" indicates a net MSD value.

The oxides of Example 9 and 11 were found to have reduction in the anisotropy of diffusion path (increased mobility in the a-axis and b-axis), resulting in an overall increase in ionic conductivity, as compared with the oxide of Comparative Example 1. From these results, it was found that the oxides of Examples 9 and 11 had increased isotropy of ion conduction paths.

Evaluation Example 5: Scanning Electron Microscopic Analysis

The oxides of Example 1, Example 2, Example 5, and Example 6 were analyzed by scanning electron microscopy (SEM). The scanning electron microscopy was performed using a FE-SEM (Hitachi SU 8030).

Figure 8A:
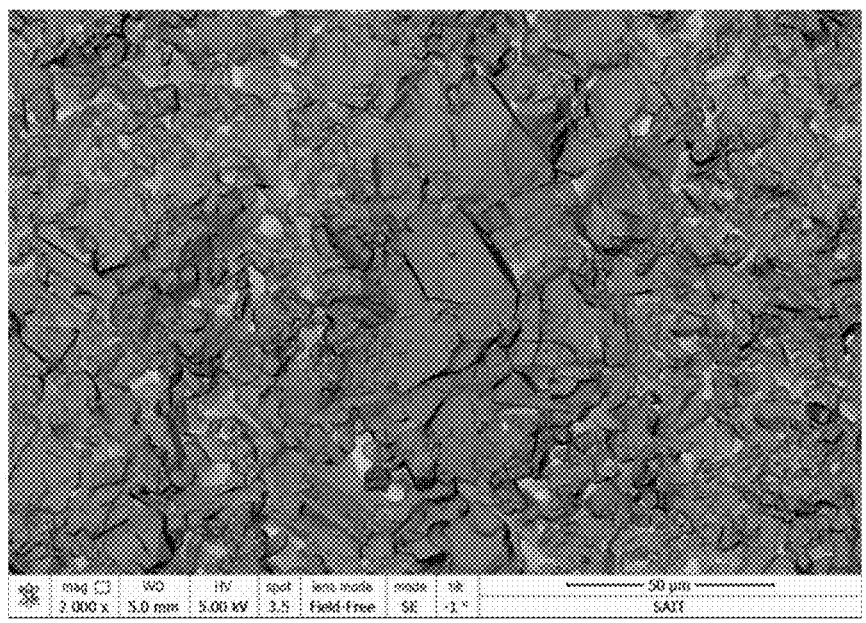
FIGS. 8A and 8B are scanning electron microscope (SEM) images of the oxide of Example 1 and Example 2, respectively.
Figure 8B:
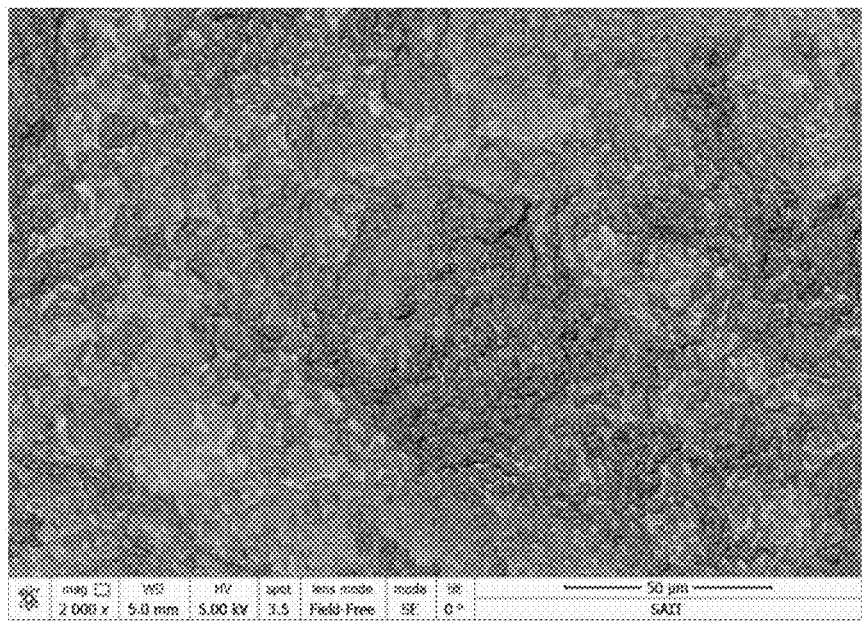
Figure 9A:
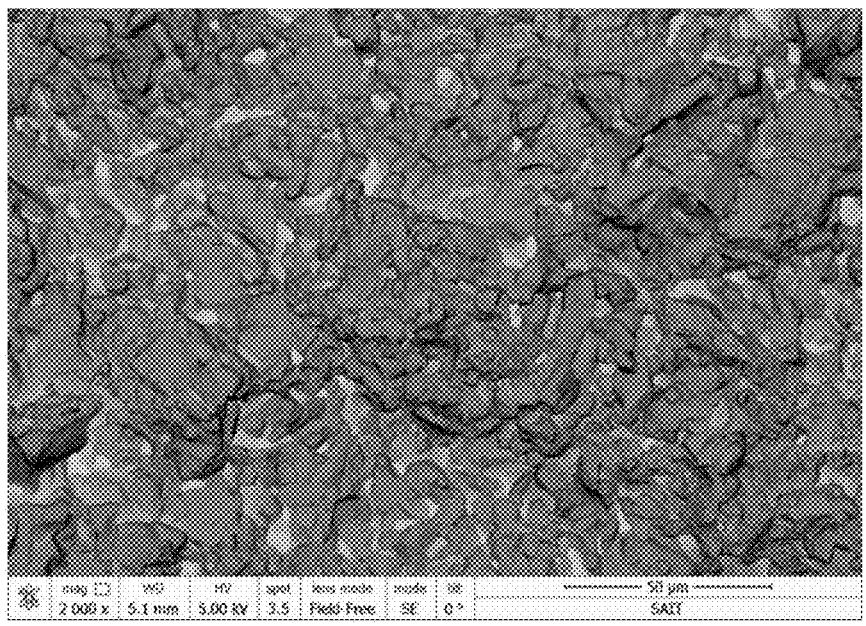
FIGS. 9A and 9B are SEM images of the oxide of Example 5 and Example 6, respectively.
Figure 9B:
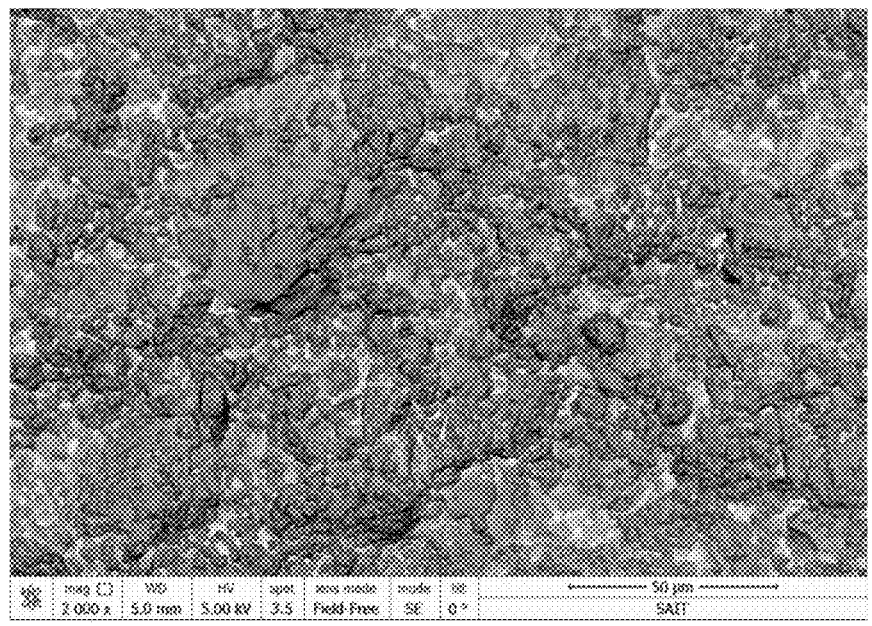

The SEM images of the oxides of Example 1 and Example 2 are shown in FIGS. 8A and 8B, respectively. The SEM images of the oxides of Example 5 and Example 6 are shown in FIGS. 9A and 9B, respectively.

Referring to FIG. 8B, the oxide of Example 2 was found to have a reduced grain size, as compared with that of the oxide of Example 1 as shown in FIG. 8A. Referring to FIG. 9B, the oxide of Example 6 was found to have a reduced grain size, as compared with that of the oxide of Example 5 as shown in FIG. 9A. Such a reduced grain side may result in improved interfacial stability of grains.

As described above, according to an embodiment, an oxide may use used as a lithium ion conductor. Such a lithium ion conductor may have excellent room temperature ionic conductivity and improved lithium stability, and may also be used as a catholyte due to a high oxidation potential. An electrochemical device with improved performance may be manufactured using such a lithium ion conductor.

It should be understood that embodiments described herein should be considered in a descriptive sense only and not for purposes of limitation. Descriptions of features, aspects, or advantages within each embodiment should be considered as available for other similar features, aspects, or advantages in other embodiments.

While embodiments have been described with reference to the figures, it will be understood by those of ordinary skill in the art that various changes in form and details may be made therein without departing from the spirit and scope as defined by the following claims.

What is claimed is:

1. An oxide comprising:
a compound represented by Formula 1, a compound represented by Formula 2, or a combination thereof,

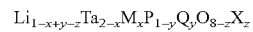   Formula 1 wherein, in Formula 1,
M is an element having an oxidation number of 5+ or 6+,
Q is an element having an oxidation number of 4+,
X is a halogen atom, a pseudohalogen, or a combination thereof,
0≤x<0.6, 0≤y<1, and 0≤z<1, wherein x and y are not 0 at the same time,

   Formula 2 wherein, in Formula 2,
M is an element having an oxidation number of 5+ or 6+,
Q is an element having an oxidation number of 4+,
X is a halogen atom, a pseudohalogen or a combination thereof,
0≤x<0.6, 0≤y<1, and 0≤z<1, wherein x and y are not 0 at the same time, and wherein in Formulas 1 and 2, M, Q, x, y, and z are independently selected.

2. The oxide of claim 1, wherein M in Formula 1 and Formula 2 each independently has
an oxidation number of 5+ or an oxidation number of 6+, and
a coordination number of 6.

3. The oxide of claim 1, wherein M in Formula 1 and Formula 2 are each independently tungsten, tellurium, selenium, niobium, vanadium, antimony, chromium, molybdenum, neodymium, technetium, bismuth, or a combination thereof.

4. The oxide of claim 1, wherein Q in Formula 1 and Formula 2 each independently is silicon, tin, titanium, germanium, selenium, palladium, rhodium, cobalt, molybdenum, chromium, ruthenium, nickel, manganese, vanadium, molybdenum, or a combination thereof.

5. The oxide of claim 1, wherein X in Formula 1 and Formula 2 are each independently chlorine, bromine, fluorine, cyanide, cyanate, thiocyanate, azide, or a combination thereof.

6. The oxide of claim 1, wherein the oxide has a monoclinic structure.

7. The oxide of claim 1, wherein the oxide exhibits peaks at diffraction angles of 17.5°±0.5°, 24.8°±0.5°, 24.9°±0.5°, 25.4°±0.5°, and 27.8°±0.5° two-theta, when analyzed by X-ray diffraction spectroscopy using Cu Kα radiation.

8. The oxide of claim 1, wherein the oxide has a lithium ion conductivity of about $1\times10^{-2}$ millisiemens per centimeter or greater at room temperature (25° C.).

9. The oxide of claim 1, wherein the oxide has an electronic conductivity of about $1\times10^{-8}$ millisiemens per centimeter or smaller at 25° C.

10. The oxide of claim 1, wherein the compound represented by Formula 1 is a compound represented by Formula 3:

$$Li_{1-x+y-z}Ta_{2-x}W_xP_{1-y}Si_yO_{8-z}X_z \quad \text{Formula 3}$$

wherein, in Formula 3,

X is a halogen atom, a pseudohalogen or a combination thereof, $0 \le x < 0.6$, $0 \le y < 1$, and $0 \le z < 1$, except for where x and y are 0 at the same time.

11. The oxide of claim 1, wherein the compound represented by Formula 2 is a compound represented by Formula 4:

$$Li_{1-x+y}Ta_{2-x}W_xP_{1-y}Si_yO_8 \cdot zLiX \quad \text{Formula 4}$$

wherein, in Formula 1,

X is a halogen, $0 \le x < 0.6$, $0 \le y < 1$, and $0 \le z < 1$, except for where x and y are 0 at the same time.

12. The oxide of claim 1, wherein the oxide is $Li_{0.9}Ta_{1.9}W_{0.1}PO_8$, $Li_{0.8}Ta_{1.8}W_{0.2}PO_8$, $Li_{0.7}Ta_{1.7}W_{0.3}PO_8$, $Li_{0.75}Ta_{1.75}W_{0.25}PO_8$, $Li_{0.6}Ta_{1.6}W_{0.4}PO_8$, $Li_{0.5}Ta_{1.5}W_{0.5}PO_8$; $Li_{0.9}Ta_{1.9}Te_{0.1}PO_8$, $Li_{0.8}Ta_{1.8}Te_{0.2}PO_8$, $Li_{0.75}Ta_{1.75}Te_{0.25}PO_8$, $Li_{0.7}Ta_{1.7}Te_{0.3}PO_8$, $Li_{0.6}Ta_{1.6}Te_{0.4}PO_8$, $Li_{0.6}Ta_{1.5}Te_{0.5}PO_8$; $Li_{0.9}Ta_{1.9}Se_{0.1}PO_8$, $Li_{0.8}Ta_{1.8}Se_{0.2}PO_8$, $Li_{0.75}Ta_{1.75}Se_{0.25}PO_8$, $Li_{0.7}Ta_{1.7}Se_{0.3}PO_8$, $Li_{0.6}Ta_{1.6}Se_{0.4}PO_8$, $Li_{0.5}Ta_{1.5}Se_{0.5}PO_8$; $Li_{0.8}Ta_{1.9}W_{0.1}PO_{7.9}Cl_{0.1}$, $Li_{0.7}Ta_{1.8}W_{0.2}PO_{7.9}Cl_{0.1}$, $Li_{0.65}Ta_{1.75}W_{0.25}PO_{7.9}Cl_{0.1}$, $Li_{0.6}Ta_{1.7}W_{0.3}PO_{7.9}Cl_{0.1}$, $Li_{0.5}Ta_{1.6}W_{0.4}PO_{7.9}Cl_{0.1}$, $Li_{0.4}Ta_{1.5}W_{0.5}P_{7.9}O_{7.9}Cl_{0.1}$; $Li_{0.85}Ta_{1.9}W_{0.1}PO_{7.95}Cl_{0.05}$, $Li_{0.75}Ta_{1.8}W_{0.2}PO_{7.95}Cl_{0.05}$, $Li_{0.7}Ta_{1.75}W_{0.25}PO_{7.95}Cl_{0.05}$, $Li_{0.65}Ta_{1.7}W_{0.3}PO_{7.95}Cl_{0.05}$, $Li_{0.55}Ta_{1.6}W_{0.4}PO_{7.95}Cl_{0.05}$, $Li_{0.45}Ta_{1.5}W_{0.5}PO_{7.95}Cl_{0.05}$; $Li_{0.8}Ta_{1.9}Nb_{0.1}PO_{7.9}Cl_{0.1}$, $Li_{0.7}Ta_{1.8}Nb_{0.2}PO_{7.9}Cl_{0.1}$, $Li_{0.65}Ta_{1.75}Nb_{0.25}PO_{7.9}Cl_{0.1}$, $Li_{0.6}Ta_{1.7}Nb_{0.3}PO_{7.9}Cl_{0.1}$, $Li_{0.5}Ta_{1.6}Nb_{0.4}PO_{7.9}Cl_{0.1}$, $Li_{0.4}Ta_{1.5}Nb_{0.5}P_{7.9}Cl_{0.1}$; $Li_{0.85}Ta_{1.9}Nb_{0.1}PO_{7.95}Cl_{0.05}$, $Li_{0.75}Ta_{1.8}Nb_{0.2}PO_{7.95}Cl_{0.05}$, $Li_{0.7}Ta_{1.75}Nb_{0.25}PO_{7.95}Cl_{0.05}$, $Li_{0.65}Ta_{1.7}Nb_{0.3}PO_{7.95}Cl_{0.05}$, $Li_{0.55}Ta_{1.6}Nb_{0.4}PO_{7.95}Cl_{0.05}$, $Li_{0.45}Ta_{1.5}Nb_{0.5}PO_{7.95}Cl_{0.05}$; $Li_{1.1}Ta_2P_{0.9}Si_{0.1}O_8$, $Li_{1.2}Ta_2P_{0.8}Si_{0.2}O_8$, $Li_{1.3}Ta_2P_{0.7}Si_{0.3}O_8$, $Li_{1.4}Ta_2P_{0.6}Si_{0.4}O_8$, $Li_{1.5}Ta_2P_{0.5}Si_{0.5}O_8$; $Li_1Ta_2P_{0.9}Si_{0.1}PO_{7.9}Cl_{0.1}$, $Li_{1.1}Ta_2P_{0.8}Si_{0.2}PO_{7.9}Cl_{0.1}$, $Li_{1.2}Ta_2P_{0.7}Si_{0.3}PO_{7.9}Cl_{0.1}$, $Li_{1.3}Ta_2P_{0.6}Si_{0.4}PO_{7.9}Cl_{0.1}$, $Li_{1.4}Ta_2P_{0.5}Si_{0.5}PO_{7.9}Cl_{0.1}$; $Li_{1.05}Ta_2P_{0.9}Si_{0.1}PO_{7.95}Cl_{0.05}$, $Li_{1.15}Ta_2P_{0.8}Si_{0.2}PO_{7.95}Cl_{0.05}$, $Li_{1.25}Ta_2P_{0.7}Si_{0.3}PO_{7.95}Cl_{0.05}$, $Li_{1.35}Ta_2P_{0.6}Si_{0.4}P_{7.95}Cl_{0.05}$, $Li_{1.45}Ta_2P_{0.5}Si_{0.5}PO_{7.95}Cl_{0.05}$; $Li_{1.1}Ta_2P_{0.9}Sn_{0.1}O_8$, $Li_{1.2}Ta_2P_{0.8}Sn_{0.2}O_8$, $Li_{1.3}Ta_2P_{0.7}Sn_{0.3}O_8$, $Li_{1.4}Ta_2P_{0.6}Sn_{0.4}O_8$, $Li_{1.5}Ta_2P_{0.5}Sn_{0.5}O_8$; $Li_{1.0}Ta_2P_{0.9}Sn_{0.1}O_{7.9}Cl_{0.1}$, $Li_{1.1}Ta_2P_{0.8}Sn_{0.2}O_{7.9}Cl_{0.1}$, $Li_{1.2}Ta_2P_{0.7}Sn_{0.3}O_{7.9}Cl_{0.1}$, $Li_{1.3}Ta_2P_{0.6}Sn_{0.4}O_{7.9}Cl_{0.1}$, $Li_{1.4}Ta_2P_{0.5}Sn_{0.5}O_{7.9}Cl_{0.1}$; $Li_{1.05}Ta_2P_{0.9}Sn_{0.1}O_{7.95}Cl_{0.05}$, $Li_{1.15}Ta_2P_{0.8}Sn_{0.2}O_{7.95}Cl_{0.05}$, $Li_{1.25}Ta_2P_{0.7}Sn_{0.3}O_{7.95}Cl_{0.05}$, $Li_{1.35}Ta_2P_{0.6}Sn_{0.4}O_{7.95}Cl_{0.05}$, $Li_{1.45}Ta_2P_{0.5}Sn_{0.5}O_{7.95}Cl_{0.05}$; $Li_{1.0}Ta_{1.9}W_{0.1}P_{0.9}Si_{0.1}O_8$, $Li_{0.9}Ta_{1.8}W_{0.2}P_{0.9}Si_{0.1}O_8$, $Li_{0.8}Ta_{1.7}W_{0.3}P_{0.9}Si_{0.1}O_8$, $Li_{0.85}Ta_{1.75}W_{0.25}P_{0.9}Si_{0.1}O_8$, $Li_{0.7}Ta_{1.6}W_{0.4}P_{0.9}Si_{0.1}O_8$, $Li_{0.6}Ta_{1.5}W_{0.5}P_{0.9}Si_{0.1}O_8$; $Li_{1.1}Ta_{1.9}W_{0.1}P_{0.8}Si_{0.2}O_8$, $Li_{1.0}Ta_{1.8}W_{0.2}P_{0.8}Si_{0.2}O_8$, $Li_{0.9}Ta_{1.7}W_{0.3}P_{0.8}Si_{0.2}O_8$, $Li_{0.95}Ta_{1.75}W_{0.25}P_{0.8}Si_{0.2}O_8$, $Li_{0.8}Ta_{1.6}W_{0.4}P_{0.8}Si_{0.2}O_8$, $Li_{0.7}Ta_{1.5}W_{0.5}P_{0.8}Si_{0.2}O_8$; $Li_{1.0}Ta_{1.9}Nb_{0.1}P_{0.9}Si_{0.1}O_8$, $Li_{0.9}Ta_{1.8}Nb_{0.2}P_{0.9}Si_{0.1}O_8$, $Li_{0.8}Ta_{1.7}Nb_{0.3}P_{0.9}Si_{0.1}O_8$, $Li_{0.85}Ta_{1.75}Nb_{0.25}P_{0.9}Si_{0.1}O_8$, $Li_{0.7}Ta_{1.6}Nb_{0.4}P_{0.9}Si_{0.1}O_8$, $Li_{0.6}Ta_{1.5}Nb_{0.5}P_{0.9}Si_{0.1}O_8$; $Li_{1.1}Ta_{1.9}Nb_{0.1}P_{0.8}Si_{0.2}O_8$, $Li_{1.0}Ta_{1.8}Nb_{0.2}P_{0.8}Si_{0.2}O_8$, $Li_{0.9}Ta_{1.7}Nb_{0.3}P_{0.8}Si_{0.2}O_8$, $Li_{0.95}Ta_{1.75}Nb_{0.25}P_{0.8}Si_{0.2}O_8$, $Li_{0.8}Ta_{1.6}Nb_{0.4}P_{0.8}Si_{0.2}O_8$, $Li_{0.7}Ta_{1.5}Nb_{0.5}P_{0.8}Si_{0.2}O_8$, $Li_{1.05}Ta_2P_{0.9}Si_{0.1}O_{7.95}Cl_{0.05}$, $Li_{1.0}Ta_2P_{0.9}Si_{0.1}O_{7.9}Cl_{0.1}$, $Li_{0.9}Ta_{1.75}W_{0.25}PO_8$, or a combination thereof.

13. The oxide of claim 1, wherein the oxide has an activation energy of 0.29 electron volts per atom or smaller.

14. A method of preparing an oxide, the method comprising:

contacting a lithium precursor, a tantalum precursor, an M precursor, a Q precursor, and a phosphorous precursor to obtain a precursor mixture; and heat-treating the precursor mixture in an oxidizing gas atmosphere to prepare the oxide, wherein the oxide is a compound represented by Formula 1, a compound represented by Formula 2, or a combination thereof $$Li_{1-x+y-z}Ta_{2-x}M_xP_{1-y}Q_yO_{8-z}X_z \quad \text{Formula 1}$$

wherein, in Formula 1,

M is an element having an oxidation number of 5+ or 6+,

Q is an element having an oxidation number of 4+,

X is a halogen atom, a pseudohalogen, or a combination thereof, $0 \le x < 0.6$, $0 \le y < 1$, and $0 \le z < 1$, wherein x and y are not 0 at the same time, $$Li_{1-x+y}Ta_{2-x}M_xP_{1-y}Q_yO_8 \cdot zLiX \quad \text{Formula 2}$$

wherein, in Formula 2,

M is an element having an oxidation number of 5+ or 6+,

Q is an element having an oxidation number of 4+,

X is a halogen atom, a pseudohalogen or a combination thereof, $0 \le x < 0.6$, $0 \le y < 1$, and $0 \le z < 1$, wherein x and y are not 0 at the same time, and wherein in Formulas 1 and 2, M, Q, x, y, and z are independently selected, and wherein in Formulas 1 and 2, when z is not zero, at least one of the lithium precursor, the tantalum precursor, the M precursor, or the Q precursor is a halide or a pseudohalide.

15. The method of claim 14, wherein the heat-treating of the precursor mixture comprises heat-treating at about 500° C. to about 1200° C.

16. The method of claim 14, wherein the heat-treating comprises a first heat-treatment at a first temperature and a second heat-treatment at a second temperature, wherein the second temperature is greater than the first temperature, wherein the first temperature is between about 500° C. to about 1000° C., and the second temperature is between about 600° C. to about 1200° C.

17. A solid electrolyte comprising:

the oxide according to claim 1.

18. An electrochemical device comprising:

the oxide according to claim 1.

19. The electrochemical device of claim 18, wherein the electrochemical device is an electrochemical battery comprising a cathode, an anode, and a solid electrolyte interposed between the cathode and the anode, and the solid electrolyte comprises the oxide according to claim 1.

20. The electrochemical device of claim 18, wherein the solid electrolyte is an electrolyte protection film, a cathode protection film, an anode protection film, or a combination thereof.

* * * * *